(12) United States Patent
Kim et al.

(10) Patent No.: US 11,775,123 B2
(45) Date of Patent: *Oct. 3, 2023

(54) TOUCH SENSOR AND METHOD OF DRIVING THE SAME

(71) Applicant: Samsung Display Co., Ltd., Yongin-si (KR)

(72) Inventors: Do Ik Kim, Yongin-si (KR); Ga Young Kim, Yongin-si (KR); Young Sik Kim, Yongin-si (KR); Sang Chul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,085

(22) Filed: Apr. 4, 2022

(65) Prior Publication Data

US 2022/0229517 A1    Jul. 21, 2022

Related U.S. Application Data

(63) Continuation of application No. 15/949,585, filed on Apr. 10, 2018, now Pat. No. 11,294,502.

(30) Foreign Application Priority Data

May 15, 2017  (KR) .......................... 10-2017-0060125

(51) Int. Cl.
*G06F 3/044* (2006.01)
*G06F 3/041* (2006.01)

(52) U.S. Cl.
CPC .......... *G06F 3/0445* (2019.05); *G06F 3/0418* (2013.01); *G06F 3/0446* (2019.05);

(Continued)

(58) Field of Classification Search
CPC .. G06F 2203/04111; G06F 2203/04112; G06F 3/0418; G06F 3/04182; G06F 3/0443; G06F 3/0445; G06F 3/0446
See application file for complete search history.

(56) References Cited

U.S. PATENT DOCUMENTS 8,841,927 B2    9/2014  Ahn et al.
9,244,573 B2    1/2016  Ryu et al.
(Continued)

FOREIGN PATENT DOCUMENTS

CN    102750057    10/2012
CN    102906679    1/2013
(Continued)

OTHER PUBLICATIONS

Non-Final Office Action dated Jun. 14, 2019, issued to U.S. Appl. No. 15/949,585.

(Continued)

*Primary Examiner* — Kenneth Bukowski
(74) *Attorney, Agent, or Firm* — H.C. Park & Associates, PLC

(57) ABSTRACT

A touch sensor includes a sensor unit including a plurality of first electrodes in an active area spaced apart from each other, and at least one second electrode, a plurality of sensing channels respectively coupled to one of the first electrodes, and each sensing channel including a reference node having a variable voltage coupled to the at least one second electrode, and a processor configured to receive output signals from the sensing channels, and detect a touch input based on the output signals. The plurality of sensing channels may be configured to supply driving signals to respective first electrodes during a first period, receive sensing signals from respective first electrodes during a second period, and generate the output signals corresponding to the sensing signals received from respective first (Continued)

electrodes based on potentials of the respective reference nodes. A method of driving a touch sensor also is disclosed.

10 Claims, 15 Drawing Sheets

(52) U.S. Cl.
CPC ............... *G06F 2203/04111* (2013.01); *G06F 2203/04112* (2013.01)

(56) References Cited

U.S. PATENT DOCUMENTS

| | | | |
|---|---|---|---|
| 9,372,582 | B2 | 6/2016 | Brunet et al. |
| 9,430,088 | B1 | 8/2016 | Lee et al. |
| 10,001,884 | B2 | 6/2018 | Collins |
| 10,282,044 | B2 | 5/2019 | Min et al. |
| 2011/0007030 | A1 | 1/2011 | Mo |
| 2013/0257785 | A1* | 10/2013 | Brown ................ G06F 3/04182 345/174 |
| 2013/0278538 | A1 | 10/2013 | Brunet et al. |
| 2014/0368467 | A1 | 12/2014 | Park et al. |
| 2015/0145802 | A1 | 5/2015 | Yao et al. |
| 2015/0179122 | A1* | 6/2015 | Brown ................ G06F 3/0443 345/174 |
| 2015/0253895 | A1 | 9/2015 | Kim |
| 2016/0196003 | A1 | 7/2016 | Yoon et al. |
| 2016/0224177 | A1 | 8/2016 | Krah |
| 2017/0090668 | A1 | 3/2017 | Agarwal |
| 2018/0157355 | A1 | 6/2018 | Kim |
| 2018/0224984 | A1 | 8/2018 | Kim et al. |
| 2018/0321793 | A1 | 11/2018 | Kim et al. |
| 2018/0329555 | A1 | 11/2018 | Kim et al. |
| 2019/0384457 | A1 | 12/2019 | Fujiyoshi |

FOREIGN PATENT DOCUMENTS

| | | |
|---|---|---|
| CN | 103376967 | 10/2013 |
| CN | 105867706 | 8/2016 |
| CN | 106648194 | 5/2017 |
| KR | 10-2012-0119419 | 10/2012 |
| KR | 10-1620463 | 5/2016 |
| KR | 10-2017-0031303 | 3/2017 |
| KR | 10-2018-0064625 | 6/2018 |
| KR | 10-2018-0090936 | 8/2018 |
| KR | 10-2018-0122761 | 11/2018 |
| KR | 10-2018-0125672 | 11/2018 |
| WO | 2011149750 | 12/2011 |

OTHER PUBLICATIONS

Final Office Action dated Dec. 11, 2019, issued to U.S. Appl. No. 15/949,585.
Non-Final Office Action dated Mar. 31, 2020, issued to U.S. Appl. No. 15/949,585.
Non-Final Office Action dated Oct. 2, 2020, issued to U.S. Appl. No. 15/949,585.
Non-Final Office Action dated Apr. 28, 2021, issued to U.S. Appl. No. 15/949,585.
Notice of Allowance dated Dec. 2, 2021, issued to U.S. Appl. No. 15/949,585.
Corrected Notice of Allowability dated Jan. 12, 2022, issued to U.S. Appl. No. 15/949,585.

\* cited by examiner

TOUCH SENSOR AND METHOD OF DRIVING THE SAME

CROSS-REFERENCE TO RELATED APPLICATIONS

This application is a Continuation of U.S. patent application Ser. No. 15/949,585, filed on Apr. 10, 2018, which claims priority from and the benefit of Korean Patent Application No. 10-2017-0060125, filed on May 15, 2017, which is hereby incorporated by reference for all purposes as if fully set forth herein.

BACKGROUND

Field

The invention relates generally to a touch sensor and a method of driving the touch sensor, and more particularly, to a touch sensor capable of preventing or decreasing the influence of the noise flowing into the touch sensor and a method of driving the touch sensor.

Discussion of the Background

A touch sensor, which is a kind of information input device, may be provided and used in a display device. For example, a touch sensor may be attached to one surface of a display panel or may be manufactured integrally with the display panel. A user may enter information by pressing or touching a touch sensor while viewing an image displayed on the screen of a display device.

The above information disclosed in this Background section is only for enhancement of understanding of the background of the inventive concepts, and, therefore, it may contain information that does not constitute prior art.

SUMMARY

Applicants discovered that the sensitivity of touch sensors can be adversely affected by noise in the sensing lines, which may be caused, for example, by other electrodes in the display adjacent to the sensing electrodes. Touch sensors constructed according to the principles of the invention are capable of providing more sensitivity than conventional touch sensors.

Driving methods and apparatus constructed according to the principles of the invention are capable of preventing or decreasing the influence of the noise flowing into the touch sensor.

Additional aspects will be set forth in the detailed description which follows, and, in part, will be apparent from the disclosure, or may be learned by practice of the inventive concepts.

According to one aspect of the invention, a touch sensor constructed according to the principles of the invention includes a sensor unit including a plurality of first electrodes in an active area spaced apart from each other, and at least one second electrode, a plurality of sensing channels respectively coupled to one of the first electrodes, and each sensing channel including a reference node having a variable voltage coupled to the at least one second electrode, and a processor configured to receive output signals from the sensing channels, and to detect a touch input based on the output signals, wherein the plurality of sensing channels are configured to supply driving signals to respective first electrodes during a first period, receive sensing signals from respective first electrodes during a second period, and generate the output signals corresponding to the sensing signals received from respective first electrodes based on potentials of the respective reference nodes.

Each of the sensing channels may include a first node coupled to any one of the first electrodes, a first voltage source coupled between the first node and the reference node, a first switch coupled between the first node and the first voltage source, a first amplifier provided with a first input terminal coupled to the first node and a second input terminal coupled to the reference node, and a second switch coupled between the first node and the first input terminal.

Each of the sensing channels may further include a capacitor and a reset switch coupled in parallel between the first input terminal and the reference node.

Each of the sensing channels may further include a second voltage source coupled between the second input terminal and the reference node.

Each of the sensing channels may further include a capacitor and a reset switch coupled in parallel between an output terminal of the first amplifier and the first input terminal.

The touch sensor may further include at least one analog-to-digital converter coupled between the output terminal of the first amplifier and the processor, and wherein the analog-to-digital converter may output a digital signal corresponding to a difference between an output voltage of the first amplifier and a voltage of the reference node.

The touch sensor may further include at least one buffer coupled between the second electrode and the reference nodes.

The touch sensor may further include an amplification circuit coupled between the second electrode and the reference nodes.

The amplification circuit may include a second amplifier provided with two input terminals respectively coupled to the second electrode and a reference voltage source, and at least one variable resistor coupled between an output terminal of the second amplifier and a reference node of at least one of the sensing channels.

The amplification circuit may further include a plurality of variable resistors coupled to one or more of the sensing channels.

The variable resistors may be coupled in parallel to each other, and may be coupled to each of the reference nodes.

Each of the first electrodes may include at least one electrode cell having an opening, and the second electrode comprises an electrode part overlapping an opening formed in an electrode cell of at least one of the first electrodes.

The first electrodes may include a plurality of first direction-first electrodes extending along a first direction in the active area, and a plurality of second direction-first electrodes extending along a second direction in the active area.

Each of the first direction-first electrodes may include a plurality of first electrode cells arranged along the first direction and provided with at least one opening therein, and a plurality of first coupling parts configured to couple the first electrode cells along the first direction, and each of the second direction-first electrodes may include a plurality of second electrode cells arranged along the second direction, and a plurality of second coupling parts configured to couple the second electrode cells along the second direction.

The sensor unit may include a plurality of second electrodes including the second electrode, the plurality of second electrodes being extending along the first direction in the active area, and each of the second electrodes may include a plurality of electrode parts overlapping respective openings of the first electrode cells, and at least one coupling line configured to couple the electrode parts in the first direction.

The second electrodes may be electrically coupled to each other.

According to another aspect of the invention, a method of driving a touch sensor having a sensor unit including a plurality of first electrodes spaced apart from each other and at least one second electrode, and a plurality of sensing channels coupled to the first electrodes, each sensing channel including a reference node coupled to at least one of the second electrodes, includes supplying driving signals to respective ones of the first electrodes during a first period, receiving sensing signals from respective ones of the first electrodes during a second period, generating output signals corresponding to respective sensing signals of the first electrodes based on variable potentials of the reference nodes, and detecting a touch input based on the output signals.

The step of generating the output signals may include generating output voltages corresponding to differences between the voltages of sensing signals input from respective ones of the first electrodes, and the voltages of respective ones of the reference nodes.

The method may further include the step of converting output voltages generated by the sensing channels into digital signals.

The touch sensor may further include at least one variable resistor coupled between the at least one second electrode and the reference nodes, and the method may further include the step of adjusting gains of signals that are input from the at least one second electrode to the reference nodes by adjusting a resistance value of the at least one variable resistor.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
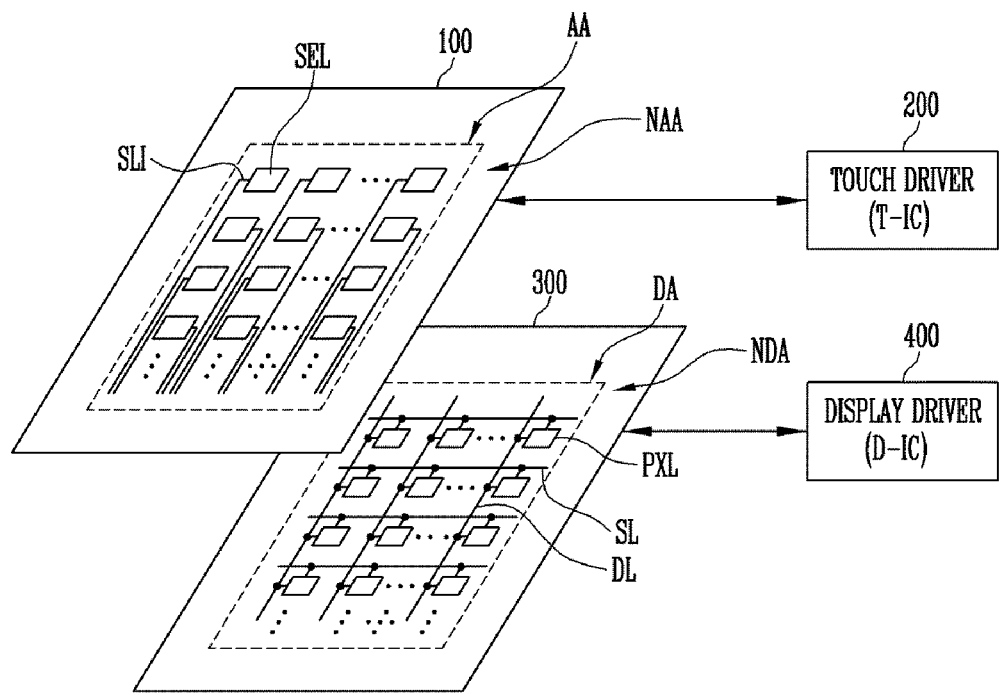
FIG. 1 is a diagram of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

FIG. 1 is a diagram of a display device constructed according to the principles of the invention.

Referring to FIG. 1, the illustrated display device may include a sensor unit 100, a touch driver 200, a display panel 300, and a display driver 400. The sensor unit 100 and the touch driver 200 may constitute a touch sensor.

Although, in the exemplary embodiment of FIG. 1, the sensor unit 100 and the display panel 300 are illustrated as being separated, the exemplary embodiments are not limited thereto. For example, the sensor unit 100 and the display panel 300 may be integrated with each other during manufacture.

In an exemplary embodiment, the sensor unit 100 may be provided in at least a certain region of the display panel 300. For example, the sensor unit 100 may be provided on at least one surface of the display panel 300 to overlap all or a portion of the display panel 300. For example, the sensor unit 100 may be arranged on one surface (e.g., top surface) in a direction in which an image is output, on both surfaces of the display panel 300, or on an opposite surface thereof (e.g., bottom surface). In an exemplary embodiment, the sensor unit 100 may be directly formed on at least one of both surfaces of the display panel 300 or may be formed inside the display panel 300. For example, the sensor unit 100 may be directly formed on an outer surface (e.g., a top surface of an upper substrate or a bottom surface of a lower substrate) or an inner surface (e.g., a bottom surface of the upper substrate or a top surface of the lower substrate) of the upper substrate and/or the lower substrate of the display panel 300.

The sensor unit 100 may include an active area AA in which a touch input may be sensed and a non-active area NAA enclosing at least a part of the active area AA. In an embodiment, the active area AA may be arranged to correspond to a display area DA of the display panel 300 and the non-active area NAA may be arranged to correspond to a non-display area NDA of the display panel 300. For example, the active area AA of the sensor unit 100 may overlap the display area DA of the display panel 300, and the non-active area NAA of the sensor unit 100 may overlap the non-display area NDA of the display panel 300.

In accordance with an exemplary embodiment, in the active area AA, a plurality of sensor electrodes SEL for detecting a touch input may be distributed and arranged. That is, the sensor electrodes SEL may be provided in the display area DA of the display panel 300. In this case, at least some of the sensor electrodes SEL may overlap at least one electrode provided in the display panel 300. For example, the when the display panel 300 is an organic light emitting display panel or a liquid crystal display panel, the sensor electrodes SEL may overlap at least a cathode electrode or a common electrode.

In accordance with an exemplary embodiment, the touch sensor may be, but is not limited to, a self-capacitive touch sensor. Each of the sensor electrodes SEL has self-capacitance to a reference potential, for example, a ground potential. Sensor lines SLI are coupled to the sensor electrodes SEL, respectively. Such sensor electrodes SEL are coupled to the touch driver 200 through the sensor lines SLI and an interface. In an embodiment the term "coupling" may inclusively mean "coupling" in physical and/or electrical aspects.

In an exemplary embodiment, the sensor electrodes SEL may be distributed over the active area AA so that, when a touch input is made in the active area AA, the location of the touch input may be detected. For example, the sensor electrodes SEL may be distributed in the form of a matrix over locations corresponding to respective coordinates (e.g., two-dimensional (2D) XY coordinates) defined in the active area AA at predetermined density or resolution. Alternatively, in an exemplary embodiment, the sensor electrodes SEL may be extended in a first direction (e.g., X direction) or a second direction (e.g., Y direction). Here, whether a touch input has been made and where the touch input has been made may be detected by aggregating variations in the self-capacitances of the sensor electrodes SEL in the first direction and in the second direction. In an exemplary embodiment, the shape, size, number, density, distribution form, and/or direction of the sensor electrodes SEL may be varied and are not especially limited.

The sensor lines SLI are coupled to the sensor electrodes SEL, respectively. A predetermined driving signal is applied to respective sensor electrodes SEL through the sensor lines SLI. Further, variation in capacitance occurring in each sensor electrode SEL is detected through the corresponding sensor line SLI.

The touch driver 200 is electrically coupled to the sensor unit 100 to drive and sense the sensor unit 100. For example, the touch driver 200 may detect a touch input by supplying a driving signal to the sensor unit 100 and then receiving a sensing signal corresponding to the driving signal from the sensor unit 100. In accordance with an exemplary embodiment, the touch driver 200 may include a plurality of sensing channels coupled to respective sensor electrodes SEL. For example, the touch driver 200 may include a plurality of sensing channels coupled to the respective sensor electrodes SEL in a one-to-one correspondence. Further, the touch driver 200 may include a processor that receives output signals of the sensing channels and detects a touch input based on the output signals. In accordance with an exemplary embodiment, the sensing channels and the processor may be integrated into a single touch integrated circuit (IC) (T-IC), but exemplary embodiments are not limited thereto.

The display panel 300 includes a display area DA, and a non-display area NDA enclosing at least a certain region of the display area DA. In the display area DA, a plurality of scan lines SL and data lines DL, and a plurality of pixels PXL coupled to the scan lines SL and the data lines DL are provided. In the non-display area NDA, wiring lines for supplying various types of driving signals and/or driving power for driving the pixels PXL may be provided.

In an exemplary embodiment, the type of display panel 300 is not especially limited. For example, the display panel 300 may be a self-emissive display panel, such as an organic light emitting display (OLED) panel. Alternatively, the display panel 300 may be a non-emissive display panel such as a liquid crystal display (LCD) panel, an electrophoretic display (EPD) panel, or an electrowetting display (EWD) panel. When the display panel 300 is a non-emissive display panel, the display device may further include a backlight unit (BLU) for supplying light to the display panel 300.

The display driver 400 may be electrically coupled to the display panel 300 to supply signals required to drive the display panel 300. For example, the display driver 400 may include at least one of a scan driver for supplying a scan signal to the scan lines SL, a data driver for supplying a data signal to the data lines DL, and a timing controller for driving the scan driver and the data driver. In an embodiment, the scan driver, the data driver, and/or the timing controller may be integrated into a single display IC (D-IC), but exemplary embodiments are not limited thereto. For example, in other embodiments, at least one of the scan driver, the data driver and the timing controller may be integrated into or mounted on the display panel 300.

Figure 2:
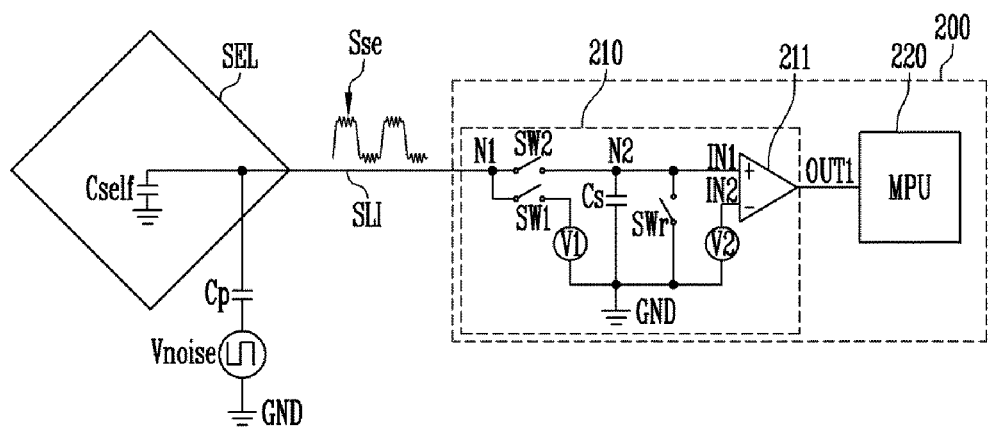
FIG. 2 is a diagram of a sensor electrode of the touch sensor shown in FIG. 1 and a sensing channel coupled to the sensor electrode.

FIG. 2 is a diagram of a sensor electrode of the touch sensor shown in FIG. 1 and a sensing channel coupled to the sensor electrode. For the convenience of illustration, only a single sensor electrode and a single sensing channel coupled thereto are illustrated in FIG. 2.

Referring to FIG. 2, each sensor electrode SEL has self-capacitance Cself to, for example, ground GND. Such a sensor electrode SEL is coupled to a touch driver 200 through a sensor line SLI.

In accordance with an exemplary embodiment, the touch driver 200 may include sensing channels 210 coupled to respective sensor electrodes SEL and a processor 220 configured to receive output signals of the sensing channels 210 and then detect a touch input. On the other hand, as described above, the sensor unit 100 is provided with a plurality of sensor electrodes SEL, and thus the touch driver 200 is provided with a plurality of sensing channels 210 coupled to respective sensor electrodes SEL. The processor 220 receives signals output from the plurality of sensing channels 210 and detects a touch input based on the output signals.

Each sensing channel 210 may include a first voltage source V1 for supplying a driving signal to the corresponding selector electrode SEL, and a first amplifier 211 for amplifying and outputting a sensing signal Sse input from the sensor electrode SEL. Further, the sensing channel 210 may include first and second switches SW1 and SW2 for selectively coupling the sensor electrode SEL to the first voltage source V1 or the first amplifier 211.

In detail, in accordance with an exemplary embodiment, each sensing channel 210 may include a first node N1 coupled to the sensor electrode SEL through the sensor line SLI, the first voltage source V1 coupled between the first node N1 and the ground GND, and the first switch SW1 coupled between the first node N1 and the first voltage source V1. In accordance with an exemplary embodiment, the first voltage source V1 may be a driving voltage source for supplying a predetermined driving signal to the sensor electrode SEL, and may be, for example, an Alternating Current (AC) voltage source for supplying a pulse wave. In an embodiment, the first switch SW1 may be turned to during a first period, thus coupling the first voltage source V1 to the first node N1. Therefore, when the first switch SW1 is turned on, a driving signal may be supplied to the sensor electrode SEL.

Further, in accordance with an exemplary embodiment, each sensing channel 210 may include the first amplifier 211 coupled between the first node N1 and the processor 220, the second switch SW2 coupled between the first node N1 and the first amplifier 211, and a capacitor Cs and a reset switch SWr coupled in parallel between the ground GND and a second node N2 that is a coupling node between the first amplifier 211 and the second switch SW2.

In an exemplary embodiment, the first amplifier 211 may include a first input terminal IN1, a second input terminal IN2, and an output terminal OUT1, wherein the first input terminal IN1 may be coupled to the first node N1 via the second switch SW2. Also, the second input terminal IN2 may be coupled to the second voltage source V2 and the output terminal OUT1 may be coupled to the processor 220. In an exemplary embodiment, the first input terminal IN1 may be a non-inverting input terminal, and the second input terminal IN2 may be an inverting input terminal, but exemplary embodiments are not limited thereto. In an exemplary embodiment, the second voltage source V2 may be a reference voltage source (or a comparative voltage source) for amplifying and outputting a sensing signal Sse and may be coupled between the second input terminal IN2 and the ground GND. In the exemplary embodiment such as that illustrated in FIG. 2, the first amplifier 211 may function as a comparator. That is, the first amplifier 211 may output a signal corresponding to a difference between voltages of the first input terminal IN1 and the second input terminal IN2.

In an exemplary embodiment, the first and second switches SW1 and SW2 may be turned on for different times. For example, the first switch SW1 may be turned on during a first period, and the second switch SW2 may be turned on during a second period subsequent to the first period. Further, during a period in which the touch sensor is activated, the first and the second periods may be alternately repeated.

When the first switch SW1 is turned on during the first period, the first voltage source V1 is coupled to the sensor electrode SEL via the first node N1 and the sensor line SLI. Accordingly, a driving signal is supplied from the first voltage source V1 to the sensor electrode SEL. Thereafter, during the second period, the first switch SW1 is turned off and the second switch SW2 is turned on, thus coupling the first node N1 to the second node N2. Accordingly, charge sharing occurs, so that a voltage corresponding to the sensing signal Sse is stored in the capacitor Cs provided in the corresponding sensing channel 210. Here, since the first input terminal IN1 of the first amplifier 211 is coupled to the second node N2, the first amplifier 211 outputs a voltage corresponding to the difference between the voltage of the second node N2 and the voltage of the second voltage source V2. That is, during the second period, each sensing channel 210 amplifies and outputs the sensing signal Sse based on the potential of the second voltage source V2. Meanwhile, the reset switch SWr is turned on at intervals of a predetermined reset period. When the reset switch SWr is turned on, the capacitor Cs is discharged and reset.

As described above, each sensing channel 210 may supply a driving signal to the sensor electrode SEL during the first period, and may receive a sensing signal Sse from the sensor electrode SEL during the second period, and then generate an output signal corresponding to the sensing signal Sse. Then, the processor 220 may detect a touch input based on the output signal of the sensing channel 210.

However, as described above with reference to FIG. 1, the sensor unit 100 of the touch sensor may be combined with the display panel 300. For example, the sensor unit 100 may be manufactured to be integrated with the display panel 300 or, alternatively, may be manufactured separately from the display panel 300 and may be attached to at least one surface of the display panel 300.

In this way, when the sensor unit 100 is combined with the display panel 300, parasitic capacitance Cp is formed between the sensor unit 100 and the display panel 300. For example, as each sensor electrode SEL overlaps a cathode electrode or a common electrode of the display panel 300, parasitic capacitance Cp may be formed between the sensor electrode SEL and the display panel 300.

Due to the coupling effect of the parasitic capacitance Cp, noise from the display panel 300 may be transferred to the sensor unit 100. For example, common mode noise caused by the driving signal of the display panel 300 may flow into the sensor unit 100. Hereinafter, noise flowing from the display panel 300 or the like into the sensor unit 100 is referred to as a "noise voltage Vnoise".

The noise voltage Vnoise flowing into the sensor unit 100 may cause ripples on the sensing signal Sse. Therefore, due to such noise voltage Vnoise, the touch sensor may malfunction, or the sensitivity of the touch sensor may be deteriorated. Accordingly, devices constructed according to the inventive concepts provide various embodiments that are capable of improving the sensitivity of the touch sensor, and a detailed description thereof will be made later.

Figure 3:
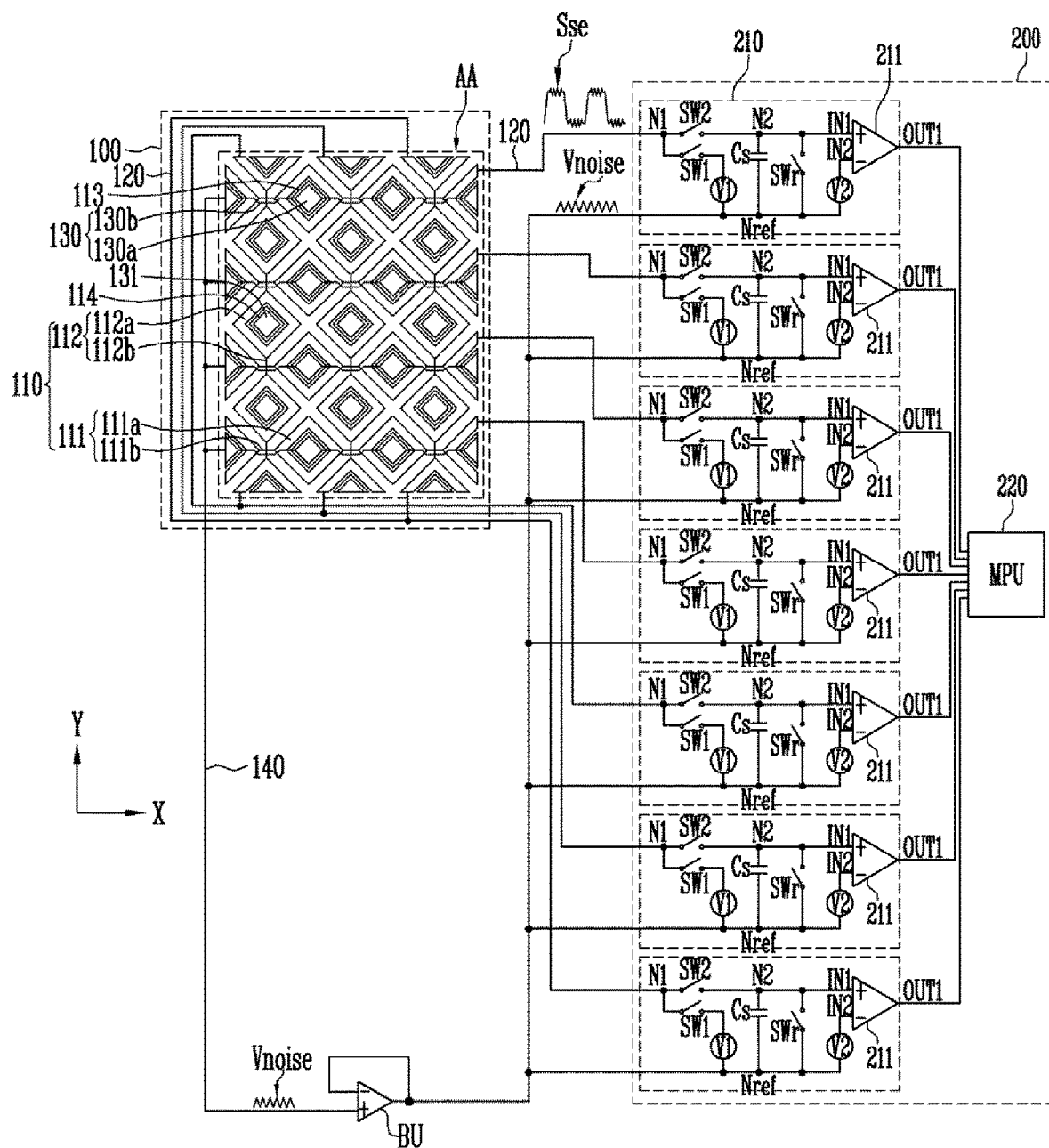
FIG. 3 is a diagram of a first embodiment of a touch sensor constructed according to the principles of the invention.

FIG. 3 is a diagram of a first embodiment of a touch sensor constructed according to the principles of the invention. In FIG. 3, the same reference numerals are used to designate components similar or identical to those in FIGS. 1 and 2, and a detailed description of the components will be omitted to avoid redundancy.

Referring to FIG. 3, the touch sensor constructed according to the principles of the invention may include a sensor unit 100 and a touch driver 200.

In accordance with an exemplary embodiment, the sensor unit 100 may include a plurality of first electrodes 110 distributed over an active area AA to be spaced apart from each other, first lines 120 coupled to the first electrodes 110, a plurality of second electrodes 130 distributed over the active area AA to be spaced apart from the first electrodes 110, and a second line 140 coupled to the second electrodes 130. In accordance with an exemplary embodiment, certain regions of at least some of the first electrodes 110 and the second electrodes 130 may overlap and/or intersect each other, but they may be separated and isolated from each other by one or more insulating layers (not illustrated).

In an exemplary embodiment, the first electrodes 110 of FIG. 3 may be obtained by implementing the sensor electrodes SEL illustrated in FIG. 1 or 2 in another form, for example, in the form of X electrodes and Y electrodes, wherein the first electrodes 110 may include a plurality of first direction-first electrodes 111 extending along a first direction (e.g., an X direction) in the active area AA, and a plurality of second direction-first electrodes 112 extending along a second direction (e.g., a Y direction) in the active area AA. On the other hand, in an exemplary embodiment, the first electrodes 110 are not necessarily extended along the first or second direction. For example, in other exemplary embodiments, the first electrodes 110 may be implemented as dot-type sensor electrodes SEL provided at locations corresponding to respective XY coordinates, as illustrated in FIG. 1 or 2.

In an exemplary embodiment, each of the first electrodes 110 may include a plurality of electrode cells 111a or 112a arranged along the first direction or the second direction, and at least one coupling part 111b or 112b configured to couple the electrode cells 111a or 112a along the first direction or the second direction. Although the electrode cells 111a and 112a are illustrated as having diamond shapes in FIG. 3, the shapes and sizes of the electrode cells 111a and 112a may be variously changed. For example, the electrode cells 111a and 112a may have other shapes such as circular or hexagonal shapes. Further, the shape of each of the first electrodes 110 may be changed in various forms. For example, in other exemplary embodiments, each of the first electrodes 110 may be implemented as an integrated bar-type electrode.

In accordance with an exemplary embodiment, each of the first direction-first electrodes 111 may include a plurality of first electrode cells 111a arranged along the first direction, and a plurality of first coupling parts 111b configured to couple the first electrode cells 111a along the first direction. In accordance with an exemplary embodiment, the first coupling parts 111b may be integrated with the first electrode cells 111a or may be implemented as bridge-connection patterns. Although an exemplary embodiment in which the first coupling parts 111b are arranged in the first direction is illustrated in FIG. 3, exemplary embodiments are not limited thereto. For example, in other exemplary embodiments, the first coupling parts 111b may be arranged in a diagonal direction that is inclined with respect to the first direction. Further, although an exemplary embodiment in which each of the first coupling parts 111b has a linear shape (or bar shape) is illustrated in FIG. 3, exemplary embodiments are not limited thereto. For example, in other exemplary embodiments, each of the first coupling parts 111b may have a shape, at least a portion of which is bent or curved. Further, although an exemplary embodiment in which two adjacent first electrode cells 111a are coupled to each other through a single first coupling part 111b interposed therebetween is illustrated in FIG. 3, exemplary embodiments are not limited thereto. For example, in other exemplary embodiments, two adjacent first electrode cells 111a may also be coupled to each other through a plurality of first coupling parts 111b interposed therebetween.

In accordance with an exemplary embodiment, the first electrode cells 111a and/or the first coupling parts 111b may include at least one of a metal material, a transparent conductive material, and various additional conductive materials, thus having conductivity. For example, the first electrode cells 111a and/or the first coupling parts 111b may include at least one of various metal materials such as gold (Au), silver (Ag), aluminum (Al), molybdenum (Mo), chrome (Cr), titanium (Ti), nickel (Ni), neodymium (Nd), copper (Cu), and platinum (Pt), or an alloy of the metal materials. Further, the first electrode cells 111a and/or the first coupling parts 111b may include at least one of various transparent conductive materials such as silver nanowires (AgNW), indium tin oxide (ITO), indium zinc oxide (IZO), antimony zinc oxide (AZO), indium tin zinc oxide (ITZO), zinc oxide (ZnO), tin oxide (SnO2), carbon nanotube, and graphene. In addition to the materials, the first electrode cells 111a and/or the first coupling parts 111b may include at least one of various conductive materials that may provide conductivity. In an exemplary embodiment, the first electrode cells 111a and/or the first coupling parts 111b may each be implemented as a single-layer structure or a multi-layer structure.

In an exemplary embodiment, each of the first electrode cells 111a may have, for example, an opened central portion and may include at least one opening (or hole) in the central portion. In accordance with an exemplary embodiment, first dummy patterns 113 floating in the shape of islands while being spaced apart from the first electrode cells 111a may be provided in respective openings of the first electrode cells 111a. In accordance with an exemplary embodiment, the first dummy patterns 113 may be made of the same material as the first electrode cells 111a, but exemplary embodiments are not limited thereto.

Exemplary embodiments are not limited to such configuration. For example, in other exemplary embodiments, openings may not be formed in the first electrode cells 111a. In this case, the first dummy patterns 113 may not be provided. Furthermore, in other embodiments, even if the first electrode cells 111a are opened, the first dummy patterns 113 may not be provided.

In accordance with an exemplary embodiment, each of the second direction-first electrodes 112 may include a plurality of second electrode cells 112a arranged along a second direction, and a plurality of second coupling parts 112b configured to couple the second electrode cells 112a along the second direction. In accordance with an exemplary embodiment, the second coupling parts 112b may be integrated with the second electrode cells 112a or may be implemented as bridge-connection patterns.

Although an exemplary embodiment in which the second coupling parts 112b are arranged in the second direction is illustrated in FIG. 3, exemplary embodiments are not limited thereto. For example, in other exemplary embodiments, the second coupling parts 112b may be arranged in a diagonal direction that is inclined with respect to the second direction. Further, although an exemplary embodiment in which each of the second coupling parts 112b has a linear shape (or bar shape) is illustrated in FIG. 3, exemplary embodiments are not limited thereto. For example, in other exemplary embodiments, each of the second coupling parts 112b may have a shape, at least a portion of which is bent or curved. Further, although an exemplary embodiment in which two adjacent second electrode cells 112a are coupled to each other through a single second coupling part 112b interposed therebetween is illustrated in FIG. 3, exemplary embodiments are not limited thereto. For example, in other exemplary embodiments, the two adjacent second electrode cells 112a may also be coupled to each other through a plurality of second coupling parts 112b interposed therebetween.

In accordance with an exemplary embodiment, the second electrode cells 112a and/or the second coupling parts 112b may include at least one of a metal material, a transparent conductive material, and various additional conductive materials, thus having conductivity. For example, the second electrode cells 112a and/or the second coupling parts 112b may include at least one of the conductive materials, described above as the materials forming the first electrode cells 111a and/or the first coupling parts 111b. Further, the second electrode cells 112a and/or the second coupling parts 112b may be made of a material identical to or different from the conductive material forming the first electrode cells 111a and/or the first coupling parts 111b. Further, the second electrode cells 112a and/or the second coupling parts 112b may each be implemented as a single-layer structure or a multi-layer structure.

In an exemplary embodiment, each of the second electrode cells 112a may have, for example, an opened central portion and may include at least one opening in the central portion. In accordance with an exemplary embodiment, second dummy patterns 114 floating in the shape of islands while being spaced apart from the second electrode cells 112a may be provided in respective openings of the second electrode cells 112a. In accordance with an exemplary embodiment, the second dummy patterns 114 may be made of the same material as the first electrode cells 111a and/or the second electrode cells 112a, but exemplary embodiments are not limited thereto.

Exemplary embodiments are not limited to such configuration. For example, in other exemplary embodiments, openings may not be formed in the second electrode cells 112a. In this case, the second dummy patterns 114 may not be provided. Further, in other exemplary embodiments, even if the second electrode cells 112a are opened, the second dummy patterns 114 may not be provided.

In accordance with an exemplary embodiment, each of the first electrodes 110 (i.e., any one of the first direction-first electrodes 111 and the second direction-first electrodes 112) may be coupled to any one sensing channel 210 provided in the touch driver 200 through the corresponding first line 120. For example, the touch driver 200 is provided with a number of sensing channels 210 corresponding to the number of first direction-first electrodes 111 and second direction-first electrodes 112, and the first direction-first electrodes 111 and the second direction-first electrodes 112 may be coupled to the sensing channels 210 in a one-to-one correspondence. Here, all of the first direction-first electrodes 111 and the second direction-first electrodes 112 may be implemented as sensor electrodes of a self-capacitive touch sensor.

The touch driver 200 may further include a separate driving circuit and a separate sensing circuit for driving the sensor unit 100 in a mutual capacitance type. Further, a mutual capacitive driving circuit may be additionally coupled to the first direction-first electrodes 111 (or the second direction-first electrodes 112), and a mutual capacitive sensing circuit may be additionally coupled to the second direction-first electrodes 112 (or the first direction-first electrodes 111). Here, the sensor unit 100 may be a sensor unit for both a self-capacitance type and a mutual capacitance type.

In accordance with an exemplary embodiment, the second electrodes 130 may be spaced apart from the first direction-first electrodes 111 or the second direction-first electrodes 112 while forming pairs with the first direction-first electrodes 111 or the second direction-first electrodes 112. For example, each of the second electrodes 130 may be extending along the first direction in the active area AA while forming a pair with any one first direction-first electrode 111, and may be spaced apart from the corresponding first direction-first electrode 111 to be isolated therefrom.

For example, each of the second electrodes 130 may include an electrode part 130a that overlaps the opening of at least one first electrode cell 111a, provided in any one of the first direction-first electrodes 111, and that is spaced apart from the first electrode cell 111a. For example, each of the second electrodes 130 may include a plurality of electrode parts 130a overlapping the opening of any one of the first direction-first electrodes 111. Each of the plurality of electrode parts 130a may be provided in a respective opening of any one of the first direction-first electrodes 111 at least when viewed in plan.

In accordance with an exemplary embodiment, respective electrode parts 130a may be disposed in the openings provided in the first electrode cells 111a to overlap respective first dummy patterns 113. In accordance with an exemplary embodiment, each of the electrode parts 130a may have an area substantially identical to or different from that of the first dummy pattern 113 corresponding thereto. For example, the electrode part 130a and the first dummy pattern 113 that overlap each other and form a pair may substantially completely overlap each other while having substantially the same area. However, in order to clearly identifiably illustrate the electrode part 130a and the first dummy pattern 113 in FIG. 3, an exemplary embodiment in which they have different areas, for example, an exemplary embodiment in which each electrode part 130a is arranged within a region in which each first dummy pattern 113 is provided while having an area smaller than that of the first dummy pattern 113, is illustrated.

Further, each of the second electrodes 130 may include at least one coupling line 130b that couples the electrode parts 130a along the first direction. In an exemplary embodiment, the coupling line 130b may be provided on a layer differing from that of the first and second electrode cells 111a and 112a, with at least one insulating layer being interposed between the coupling line 130b and the first and second electrode cells 111a and 112a, thus being isolated from the first and second electrode cells 111a and 112a.

In accordance with an exemplary embodiment, the electrode parts 130a and/or the coupling lines 130b may include at least one of a metal material, a transparent conductive material, and various additional conductive materials, thus having conductivity. For example, the electrode parts 130a and/or the coupling lines 130b may include at least one of conductive materials, described above as the material forming the first electrode cells 111a, the first coupling parts 111b, the second electrode cells 112a, and/or the second coupling parts 112b. Further, the electrode parts 130a and/or the coupling lines 130b may be made of a material substantially identical to or different from the conductive material forming the first electrode cells 111a, the first coupling parts 111b, the second electrode cells 112a, and/or the second coupling parts 112b. Also, the electrode parts 130a and/or the coupling lines 130b may be implemented as a single-layer structure or a multi-layer structure.

In accordance with an exemplary embodiment, at least some of the second electrodes 130 may be electrically coupled to each other. For example, all of the second electrodes 130 may be electrically coupled to each other while sharing a single second line 140. In this case, the second electrodes 130 may also be regarded as a single integrated electrode. However, exemplary embodiments are not limited to such configuration. For example, in other exemplary embodiments, respective second electrodes 130 may be coupled to different lines and isolated from each other. Alternatively, in other exemplary embodiments, the second electrodes 130 may be divided into a plurality of groups, and the second electrodes 130 in each group may be electrically coupled to each other.

In accordance with an exemplary embodiment, the second electrodes 130 may be coupled to the touch driver 200 through the second line 140. In particular, in an exemplary embodiment, the second electrodes 130 may be coupled to the reference potential terminal of the touch driver 200. For example, the second electrodes 130 may be coupled to respective reference nodes (reference potential nodes) Nref of the sensing channels 210. That is, unlike in the exemplary embodiment of FIG. 2, in this exemplary embodiment, the sensing channels 210 are operated based on the potentials of the reference nodes Nref coupled to the second electrodes 130, rather than based on a ground potential. In an exemplary embodiment, at least one buffer BU may be coupled between the second electrodes 130 and the reference nodes Nref. The buffer BU may buffer and output signals (e.g., noise voltages Vnoise) input from the second electrodes 130.

In an exemplary embodiment, the sensor unit 100 may further include third dummy patterns 131 having sizes and shapes corresponding to respective electrode parts 130a of the second electrodes 130, and provided in the respective second electrode cells 112a. For example, the third dummy patterns 131 may further include third dummy patterns 131 provided on the same layer as the electrode parts 130a to have sizes and shapes substantially identical to those of the electrode parts 130a. In an exemplary embodiment, the third dummy patterns 131 may overlap the second dummy patterns 114. In this case, the active area AA may have entirely uniform patterns, and thus uniform visible properties may be secured in the overall active area AA. However, exemplary embodiments are not limited to such configuration. For example, in other exemplary embodiments, at least some of the first, second, and third dummy patterns 113, 114, and 131 may not be provided.

Meanwhile, although an exemplary embodiment in which the first electrodes 110 and the second electrodes 130 include plate-shaped electrode cells 111a and 112a or electrode parts 130a is illustrated in FIG. 3, exemplary embodiments are not limited thereto. For example, in other exemplary embodiments, at least one of the first electrodes 110 and the second electrodes 130 may be implemented as a mesh-shaped electrode.

In accordance with an exemplary embodiment, each of the sensing channels 210 may include a first node N1 coupled to any one of the first electrodes 110 via the corresponding first line 120, and a reference node Nref coupled to the second electrodes 130 via the buffer BU and the second line 140.

Each of the sensing channels 210 may include first and second switches SW1 and SW2, a first voltage source V1, a first amplifier 211, a second voltage source V2, a capacitor Cs, and a reset switch SWr.

The first switch SW1 may be coupled between the first node N1 and the first voltage source V1. The second switch SW2 may be coupled between the first node N1 and the first input terminal IN1 of the first amplifier 211. The first voltage source V1 may be coupled between the first node N1 and the reference node Nref. The first amplifier 211 may include the first input terminal IN1 coupled to the first node N1 via the second switch SW2, a second input terminal IN2 coupled to the reference node Nref via the second voltage source V2, and an output terminal OUT1 coupled to the processor 220. The second voltage source V2 may be coupled between the second input terminal IN2 and the reference node Nref. The capacitor Cs and the reset switch SWr may be coupled in parallel between the first input terminal IN1 and the reference node Nref.

The exemplary embodiment of FIG. 3 is different from the exemplary embodiment of FIG. 2 in that the reference nodes Nref of respective sensing channels 210 are coupled to the second electrodes 130 rather than the ground GND. However, an actual operating procedure performed by the sensing channels 210 according to the exemplary embodiment of FIG. 3 is substantially identical to that of the exemplary embodiment of FIG. 2.

That is, the sensing channels 210 may supply driving signals to respective first electrodes 110 during a first period, and may receive sensing signals Sse from the respective first electrodes 110 during a second period. Such sensing channels 210 generate output signals corresponding to the sensing signals Sse input from the respective first electrodes 110 based on the potentials of the reference nodes Nref. For example, the sensing channels 210 may generate output voltages corresponding to differences between the voltages of the sensing signals Sse from the respective first electrodes 110 and the voltages of the reference nodes Nref. The output voltages of the sensing channels 210 are input to the processor 220.

The processor 220 receives the output signals of the sensing channels 210 and detects a touch input based on the output signals. For example, the processor 220 may detect whether a touch input has been made and where the touch input has been made by aggregating the output signals received from the sensing channels 210. In accordance with an exemplary embodiment, the processor 220 may be implemented as, but is not limited to, a microprocessor (MPU). For example, in an exemplary embodiment, the processor 220 may be implemented as a microcontroller (MCU) or any of other type of processors.

As described above, in an exemplary embodiment, the second electrodes 130 are further provided in addition to the electrodes for detecting a touch input, for example, the first electrodes 110. The second electrodes 130 are isolated from the first electrodes 110, and parasitic capacitance is formed between each of the second electrodes 130 and neighboring electrodes (at least some of the first electrodes 110, at least one electrode of the display panel 300, and at least some of other second electrodes 130 adjacent to the corresponding second electrode). Such second electrodes 130 are electrically coupled to the reference potential terminal of the touch driver 200, for example, the reference nodes Nref of the sensing channels 210.

Therefore, the voltages of the reference nodes Nref also vary depending on variation in the voltages of the second electrodes 130. That is, the reference potentials of the sensing channels 210 may vary depending on the potentials (voltage levels) of the second electrodes 130.

On the other hand, the potentials of the second electrodes 130 may vary depending on the noise voltage Vnoise flowing from the display panel 300 or the like into the sensor unit 100. For example, the potentials of the second electrodes 130 may vary in response to the voltage level of common mode noise flowing from the display panel 300 or the like into the sensor unit 100.

Therefore, as in the exemplary embodiments, when the second electrodes 130 may be further provided in the active area AA, and the reference potentials of the sensing channels 210 are varied using noise voltages Vnoise flowing into the second electrodes 130, noise components (ripples) included in the sensing signals Sse input to the sensing channels 210 may be cancelled or reduced within the sensing channels 210. Accordingly, the sensitivity of the touch sensor may be improved by increasing the signal-to-noise ratio (hereinafter referred to as "SNR") of the touch sensor. That is, in accordance with an exemplary embodiment, there may be provided a touch sensor, in which malfunctioning caused by noise is minimized and which is highly sensitive, and a display device having the touch sensor.

Further, in an exemplary embodiment, respective electrode parts 130a of the second electrodes 130 are arranged not to overlap at least the first and second electrodes cells 111a and 112a. Accordingly, parasitic capacitances between the first direction-first electrodes 111/the second direction-first electrodes 112 and the second electrodes 130 may be decreased.

Furthermore, the sensor unit 100 may be driven in any operating mode selected from a self-capacitance type and a mutual capacitance type. Here, when the sensor unit 100 is driven by the mutual capacitance mode, the first direction-first electrodes 111 may be used as sensing electrodes, and the second direction-first electrodes 112 may be used as driving electrodes. In this case, variation in the voltages of the second electrodes 130 caused by driving signals may be reduced or prevented. Accordingly, noise voltages Vnoise may be effectively detected.

The above-described exemplary embodiment varies the voltage of the reference potential terminal of the touch driver 200, for example, the voltages of the reference nodes Nref of the sensing channels 210, depending on the noise voltage Vnoise flowing into the sensor unit 100. Accordingly, the influence of the noise voltage Vnoise flowing into the touch sensor may be prevented or decreased. This exemplary embodiment may be usefully applied to a display device or the like having a short distance between the sensor unit 100 and the display panel 200. For example, when the exemplary embodiment is applied to a noise-sensitive on-cell display device or the like in which the first electrodes 110 are directly formed on an upper substrate or a thin-film encapsulation (TFE) layer of the display panel 300, touch sensitivity may be effectively improved. However, it is apparent that the scope of application of exemplary embodiments is not limited thereto, and the exemplary embodiments may be applied to various types of additional display devices or electronic devices.

Figure 4:
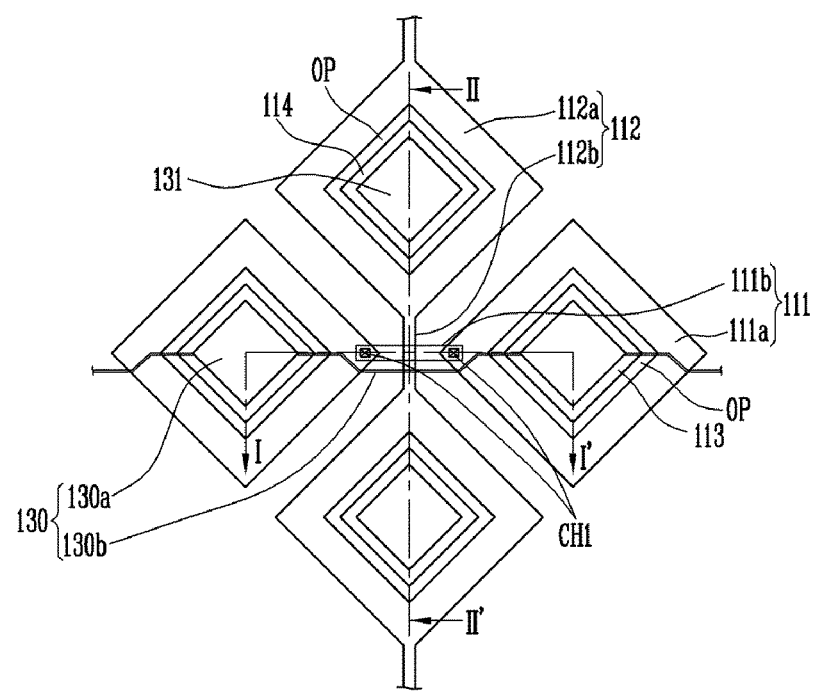
FIG. 4 is a diagram of an exemplary embodiment of a sensor unit shown in FIG. 3.
Figure 5A:
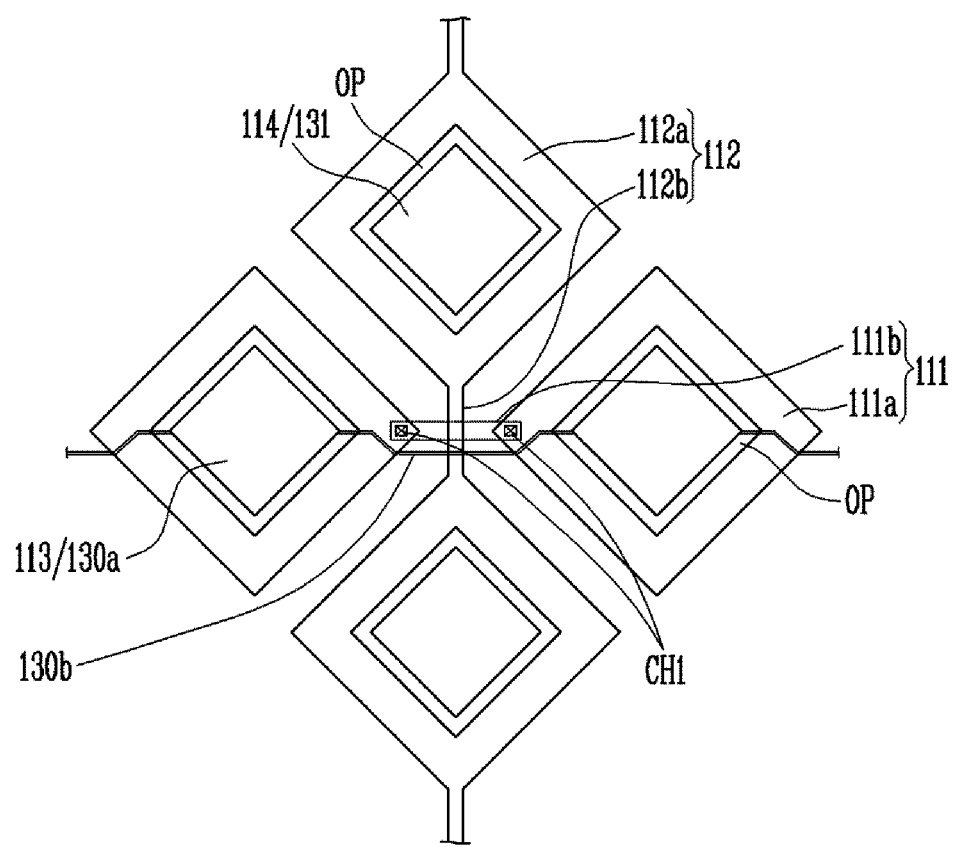
FIGS. 5A and 5B are diagrams illustrating different modifications of the sensor unit in FIG. 4.
Figure 5B:
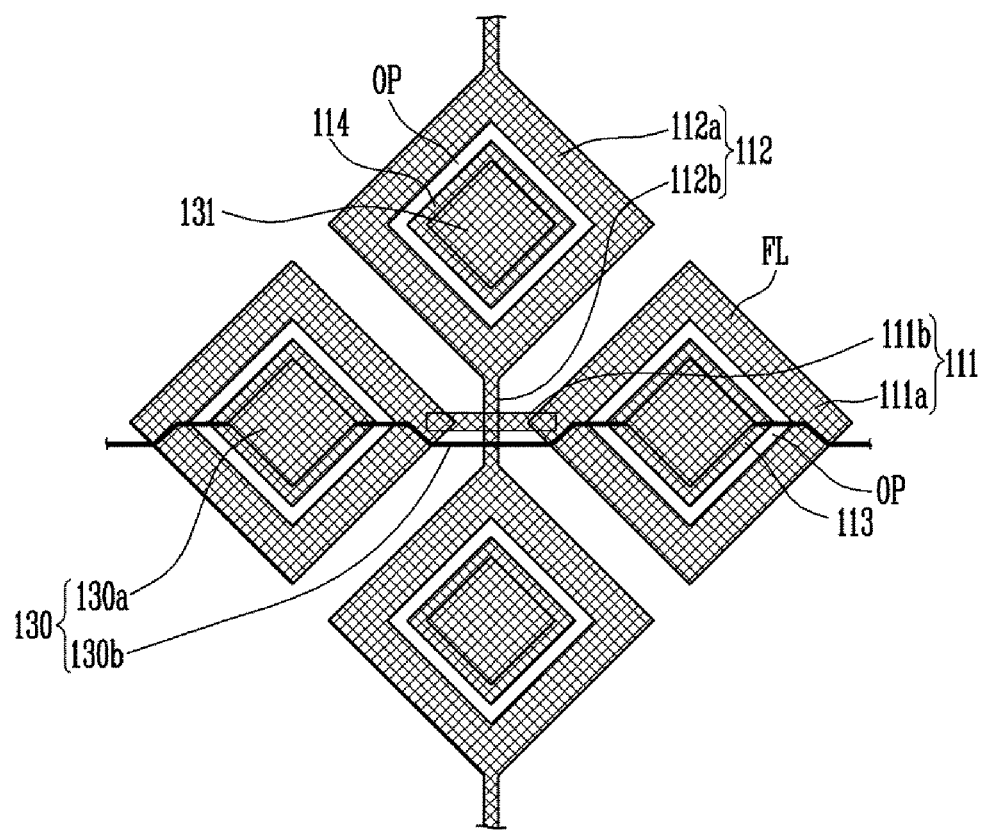
Figure 6A:
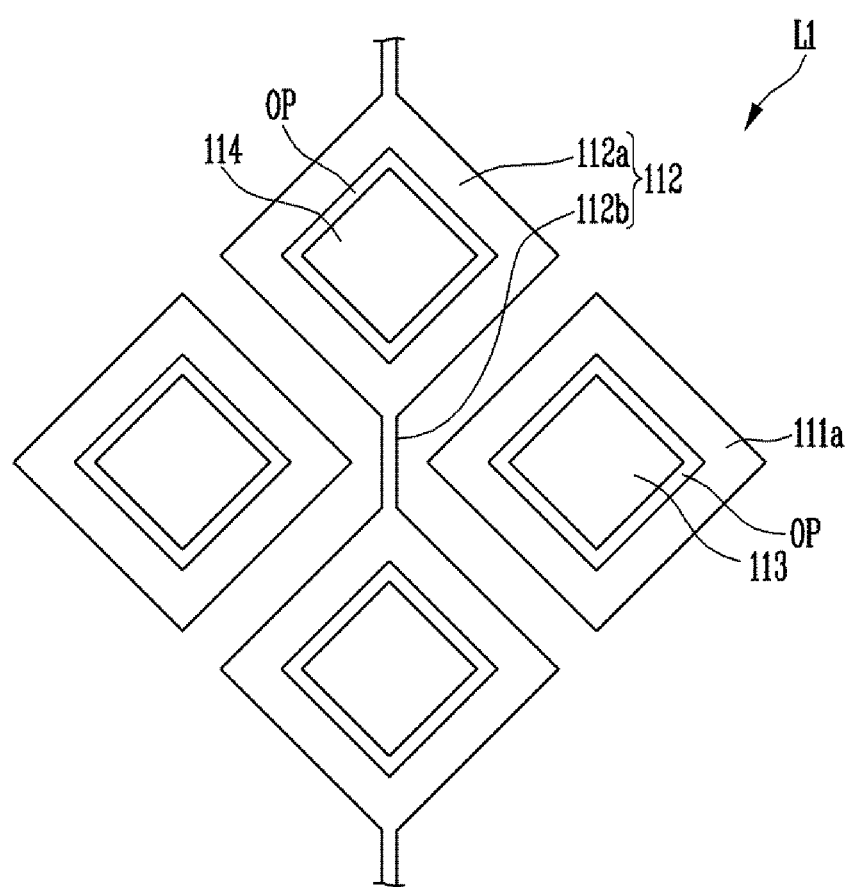
FIG. 6A is a diagram of a first layer of the sensor unit in FIG. 4.
Figure 6B:
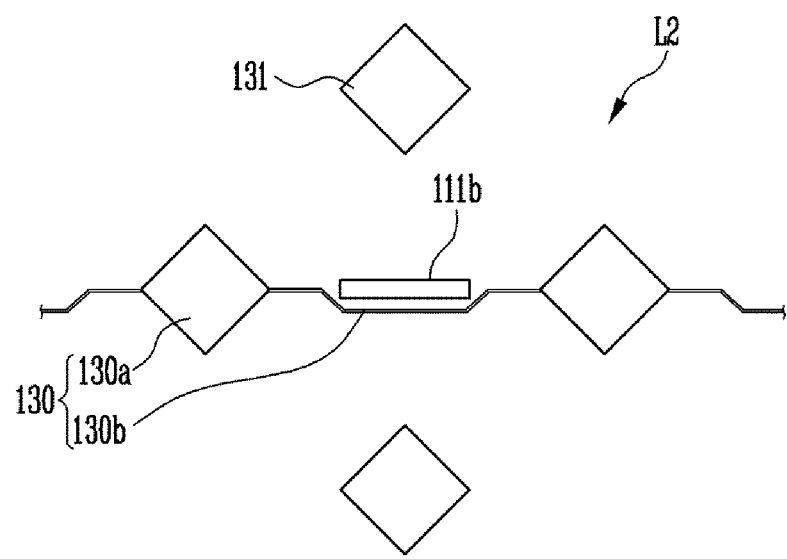
FIG. 6B is a diagram of a second layer of the sensor unit in FIG. 4.
Figure 7A:
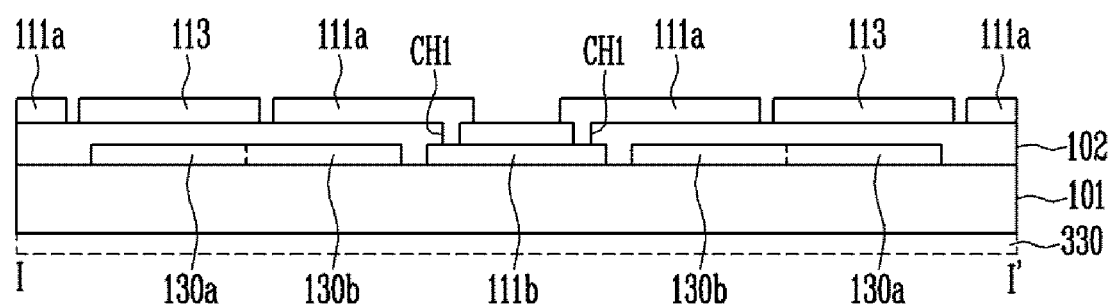
FIG. 7A is a cross-sectional view taken along line I-I' of FIG. 4.
Figure 7B:
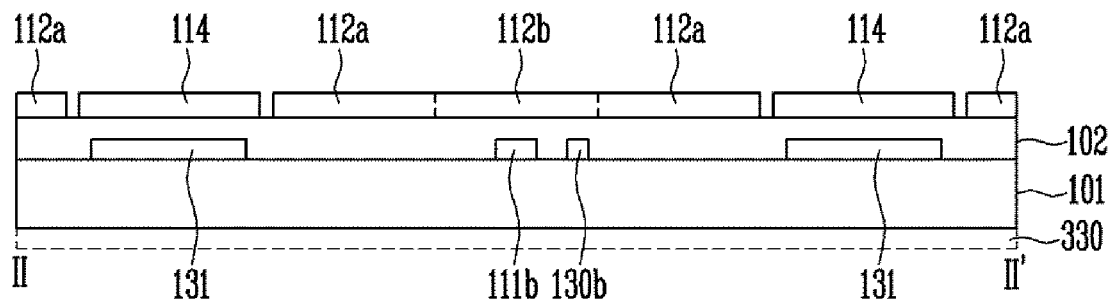
FIG. 7B is a cross-sectional view taken along line II-II' of FIG. 4.

FIG. 4 is a diagram of an exemplary embodiment of the sensor unit shown in FIG. 3, and FIGS. 5A and 5B are diagrams illustrating different modifications of the sensor unit in FIG. 4. FIG. 6A is a diagram of a first layer of the sensor unit in FIG. 4, and FIG. 6B is a diagram of a second layer of the sensor unit in FIG. 4. FIG. 7A is a cross-sectional view taken along line I-I' of FIG. 4, and FIG. 7B is a cross-sectional view taken along line II-II' of FIG. 4. In FIGS. 4 to 7B, the same reference numerals are used to designate components similar or identical to those in FIG. 3, and a detailed description of the components will be omitted to avoid redundancy.

Referring to FIGS. 4 to 7B, in an exemplary embodiment, the first electrodes cells 111a and the second electrode cells 112a may be arranged on the same layer spaced apart from each other. For example, the first electrode cells 111a and the second electrode cells 112a may be provided on a first layer L1 of a substrate 101. Further, openings OP may be formed in respective internal regions, for example, respective central portions of the first electrodes cells 111a and the second electrode cells 112a. Furthermore, first dummy patterns 113 that are floating may be provided in the openings OP of the first electrode cells 111a, and second dummy patterns 114 that are floating may be provided in the openings OP of the second electrode cells 112a. In accordance with an embodiment, the first and second dummy patterns 113 and 114 may be arranged on the same layer, for example, the first layer L1, as the first and second electrode cells 111a and 112a are spaced apart from the first and second electrode cells 111a and 112a. However, exemplary embodiments are not limited to such configuration. For example, in other exemplary embodiments, at least one of the first and second dummy patterns 113 and 114 may not be provided or, alternatively, at least one of the first and second dummy patterns 113 and 114 may be provided on a layer different from that of the first and second electrode cells 111a and 112a.

In an exemplary embodiment, either the first coupling parts 111b or the second coupling parts 112b may be provided on the first layer L1 together with the first and second electrode cells 111a and 112a. For example, the second coupling parts 112b may be coupled to be integrated with the second electrode cells 112a and may then be provided on the first layer L1. However, exemplary embodiments are not limited to such configuration. For example, in other exemplary embodiments, both the first and second coupling parts 111b and 112b may be disposed on a layer different from that of the first and second electrode cells 111a and 112a. Alternatively, in an exemplary embodiment, the first and second electrode cells 111a and 112a may be located on different layers that are spaced apart from each other. For example, the first electrode cells 111a may be coupled to be integrated with the first coupling parts 111b, and the second electrode cells 112a may be coupled to be integrated with the second coupling parts 112b, but the first direction-first electrodes 111 and the second direction-first electrodes 112 may be disposed on different layers spaced apart from each other.

In an exemplary embodiment, the first coupling parts 111b may be arranged on a second layer L2 isolated from the first layer L1 in a state in which at least one insulating layer, for example, a first insulating layer 102 illustrated in FIGS. 7A and 7B, is interposed between the first and second layers L1 and L2. In an embodiment, the second layer L2 may be located between the substrate 101 and the first layer L1. That is, the first coupling parts 111b may be implemented as a lower bridge. However, exemplary embodiments are not limited to such configuration. For example, in other exemplary embodiments, the locations of the first layer L1 and the second layer L2 may be reversed. That is, in accordance with an exemplary embodiment, the first layer L1 may be arranged between the substrate 101 and the second layer L2, and the first coupling parts 111b may be implemented as an upper bridge. In this way, when the first coupling parts 111b are arranged on a layer different from that of the first electrode cells 111a, the first coupling parts 111b may be electrically coupled between adjacent first electrode cells 111a through first contact holes CH1.

Further, in accordance with an exemplary embodiment, the second electrodes 130 and the third dummy patterns 131 may be provided on the second layer L2. In other embodiments, at least some of the first coupling parts 111b, the second electrodes 130, and the third dummy patterns 131 may be arranged on different layers. For example, the first direction-first electrodes 111 and the second direction-first electrodes 112 may be disposed on different layers that are spaced apart from each other, and the second electrodes 130 may be arranged on a middle layer between the two layers on which the first direction-first electrodes 111 and the second direction-first electrodes 112 are disposed.

In accordance with an exemplary embodiment, the electrode parts 130a may be provided in the respective openings OP of the first electrode cells 111a. For example, the electrode parts 130a may be provided in the respective first electrode cells 111a so that the electrode parts 130a have an area smaller than that of the first dummy patterns 113 and overlap the first dummy patterns 113, as illustrated in FIG. 4. In this way, when the electrode parts 130a are arranged in the first electrode cells 111a so that they do not overlap the first electrode cells 111a, parasitic capacitance between the first electrodes 110 and the second electrodes 130 may be reduced. However, the areas/shapes and/or locations of the electrode parts 130a are not especially limited, and may be changed and practiced in various ways.

For example, as illustrated in FIG. 5A, an electrode part 130a and a first dummy pattern 113, which form a pair and correspond to each other, may completely overlap each other while having substantially the same area and substantially the same shape. In this case, a second dummy pattern 114 and a third dummy pattern 131, which form a pair and correspond to each other, may also completely overlap each other while having substantially the same area and substantially the same shape, thus enabling the active area AA to be entirely, uniformly visualized.

In accordance with an exemplary embodiment, in FIGS. 4 and 5A, all of the first and second electrode cells 111a and 112a, the first and second coupling parts 111b and 112b, the first and second dummy patterns 113 and 114, and the electrode parts 130a are illustrated as being generally plate-shaped or generally bar-shaped patterns, but exemplary embodiments are not limited thereto. For example, at least one type of the first and second electrode cells 111a and 112a, the first and second coupling parts 111b and 112b, the first and second dummy patterns 113 and 114, and the electrode parts 130a may also be implemented as mesh-shaped electrodes or patterns. That is, in other exemplary embodiments, at least one type of the first direction-first electrodes 111, the second direction-first electrodes 112, the second electrodes 130, and the first and second dummy patterns 113 and 114 may be implemented in a mesh shape.

For example, as illustrated in FIG. 5B, each of the first and second electrode cells 111a and 112a, the first and second coupling parts 111b and 112b, the first and second dummy patterns 113 and 114, and the electrode parts 130a may be a mesh-shaped electrode or pattern including a plurality of conductive fine lines FL. Further, although it is illustrated in FIG. 5B that each of the coupling lines 130b has the form of a single line, each of the coupling lines 130b may also be implemented in the shape of a mesh including a plurality of conductive fine lines. Furthermore, although an exemplary embodiment in which the conductive fine lines FL are arranged, for example, in a diagonal direction is illustrated in FIG. 5B, the arrangement direction or shape of the conductive fine lines FL may be changed in various ways. Furthermore, the illustration of contact holes (e.g., the first contact holes CH1 of FIG. 4) is omitted in FIG. 5B for the convenience of illustration. However, when the first electrode cells 111a and the first coupling parts 111b are arranged on different layers, the first electrode cells 111a and the first coupling parts 111b constituting respective first direction-first electrodes 111 may be physically and/or electrically coupled to each other through contact holes.

On the other hand, in other exemplary embodiments, only some of the first and second electrode cells 111a and 112a, the first and second coupling parts 111b and 112b, the first and second dummy patterns 113 and 114, and the electrode parts 130a may be implemented as generally plate-shaped or generally bar-shaped electrodes or patterns, and the remaining components may be implemented in a mesh shape. That is, in the exemplary embodiments, the shapes or structures of the first direction-first electrodes 111, the second direction-first electrodes 112, the second electrodes 130, and the first and second dummy patterns 113 and 114 may be changed and practiced in various forms.

In accordance with an exemplary embodiment, the electrode parts 130a may be coupled in a first direction through the coupling lines 130b. Certain regions of the coupling lines 130b may overlap the first electrode cells 111a. In an exemplary embodiment, the electrode parts 130a and the coupling lines 130b may be provided on the second layer L2 of the sensor unit 100, together with the first coupling parts 111b. Here, the electrode parts 130a and the coupling lines 130b may be coupled to be integrated with each other.

When the electrode parts 130a and the coupling lines 130b are arranged on the same layer as the first coupling parts 111b, the coupling lines 130b may be provided not to overlap the first coupling parts 111b. For example, the coupling lines 130b may electrically couple adjacent electrode parts 130a by detouring around a region in which the first coupling parts 111b are provided so that the coupling lines 130b do not pass through the region. By means of this, the first direction-first electrodes 111 and the second electrodes 130 that are located in corresponding regions may be maintained in an isolated state.

In the above-described exemplary embodiment, openings OP may be respectively formed in the first and second electrode cells 111a and 112a, and the electrode parts 130a or the third dummy patterns 131 of the second electrodes 130 may be arranged in the openings OP. By means of this structure, noise voltages Vnoise may be effectively detected, and the active area AA may be substantially, uniformly visualized.

Meanwhile, in some exemplary embodiments, the substrate 101 that is the basic material of the sensor unit 100 may be any one of a substrate and an insulating layer constituting a display panel (e.g., 300 of FIG. 1). For example, the display panel 300 may be an organic light emitting display panel provided with a thin-film encapsulation layer, and the substrate 101 may be the thin-film encapsulation layer. That is, in an exemplary embodiment, sensor patterns constituting the sensor unit 100, for example, the first direction-first electrodes 111, the second direction-first electrodes 112, the second electrodes 130, the first dummy patterns 113 and/or the second dummy patterns 114 may be directly formed and/or provided on the thin-film encapsulation layer of the organic light emitting display panel. In this case, sensor patterns provided on a first surface (e.g., a top surface) of the substrate (thin-film encapsulation layer) 101 are located near a second electrode, e.g., a cathode electrode 330 of a light-emitting element provided on a second surface (e.g., a bottom surface) of the substrate 101 (e.g., provided to be in contact with the second surface of the substrate 101). Accordingly, a noise voltage Vnoise from the cathode electrode 330 may flow into sensor patterns.

However, as described above, in an exemplary embodiment, noise voltages Vnoise may be cancelled or reduced using the second electrodes 130 provided in the sensor unit 100. Therefore, in accordance with an exemplary embodiment, when a sensor-display integrated panel provided with a thin-film encapsulation layer is implemented, and the thickness of the thin-film encapsulation layer is decreased, for example, below about 10 μm, the sensitivity of the touch sensor may be sufficiently secured.

FIGS. 8 to 12 are diagrams illustrating other exemplary embodiments of the sensor unit shown in FIG. 3, and respectively illustrate different modifications of the exemplary embodiment of FIG. 4. That is, FIGS. 4, and 8 to 12 illustrate various exemplary embodiments related to the sensor unit in FIG. 3. In FIGS. 8 to 12, the same reference numerals are used to designate components similar or identical to those in the above-described embodiments, and a detailed description of the components will be omitted to avoid redundancy.

Figure 8:
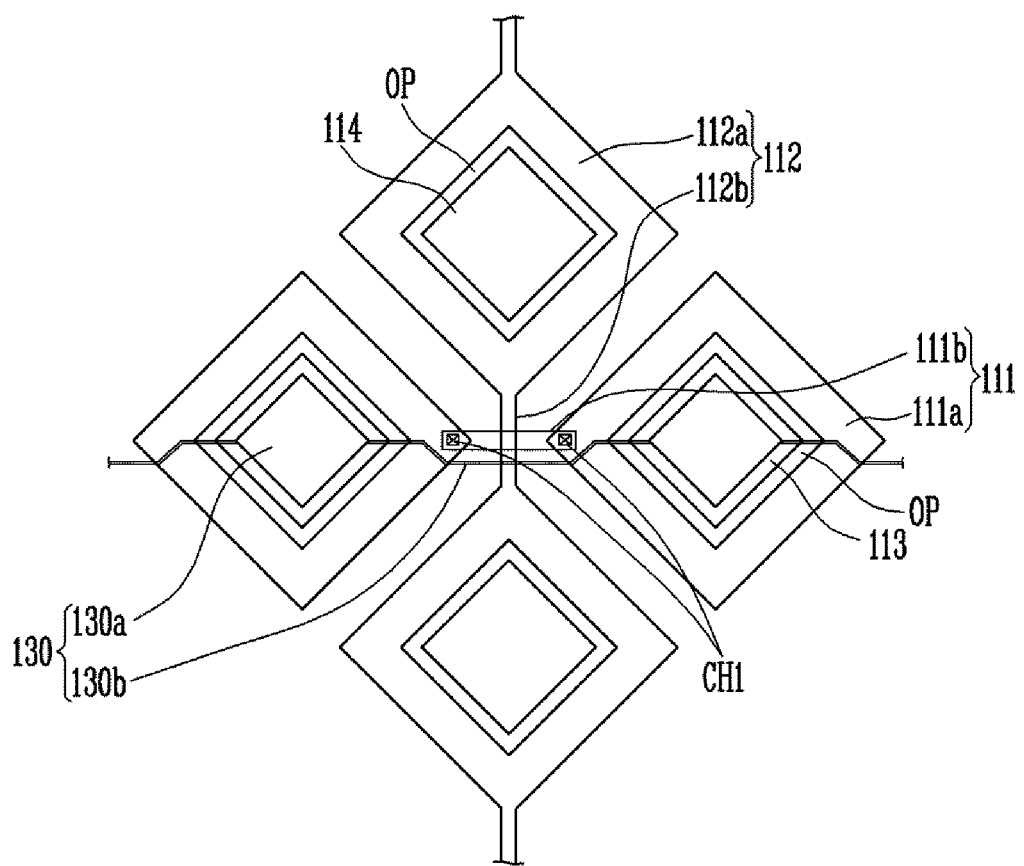
FIGS. 8 to 12 are diagrams illustrating other exemplary embodiments of the sensor unit shown in FIG. 3.

Referring to FIG. 8, third dummy patterns 131 may not be provided. Here, second dummy patterns 114 may be provided on the same layer as second electrode cells 112a, for example, on a first layer L1, but the location thereof is not especially limited. For example, in other exemplary embodiments, the second dummy patterns 114 may be provided on the same layer as second electrodes 130, for example, on a second layer L2.

Figure 9:
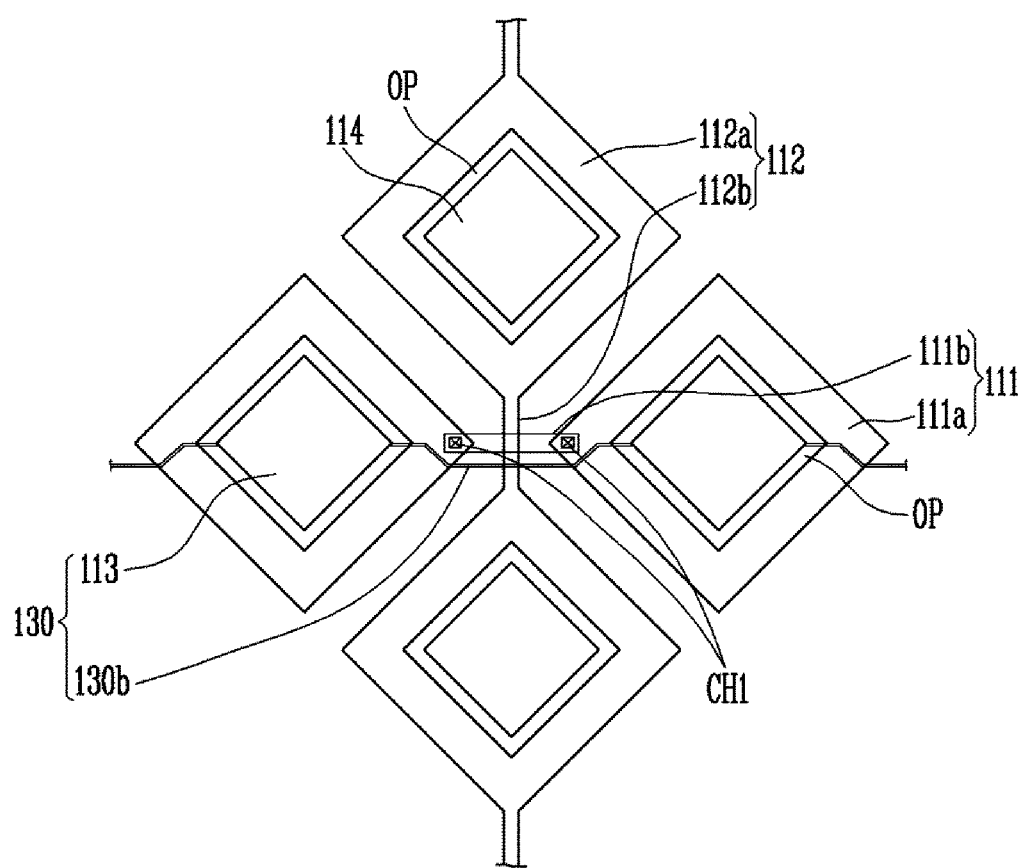

Referring to FIG. 9, electrode parts 130a and third dummy patterns 131 on the second layer L2 may not be provided. Instead, in an exemplary embodiment of FIG. 9, first dummy patterns 113 provided on the first layer L1, together with the second electrode cells 111a and 112a, are coupled in a first direction through coupling lines 130b provided on the second layer L2. In this exemplary embodiment, the second electrodes 130 may be formed using the first dummy patterns 113 and the coupling lines 130b. In this way, in some exemplary embodiments, the first dummy patterns 113 may be used as the electrode parts of the second electrodes 130. In this case, the electrode parts (i.e., the first dummy patterns 113) may be provided on the first layer L1 of the sensor unit 100 to be spaced apart from the first electrode cells 111a. Also, the coupling lines 130b may be provided on the second layer L2 isolated from the first layer L1 in a state in which at least one insulating layer, for example, the first insulating layer 102, is interposed between the first layer L1 and the second layer L2, and may be electrically coupled to the electrode parts through contact holes (not illustrated) formed through the first insulating layer 102.

Figure 10:
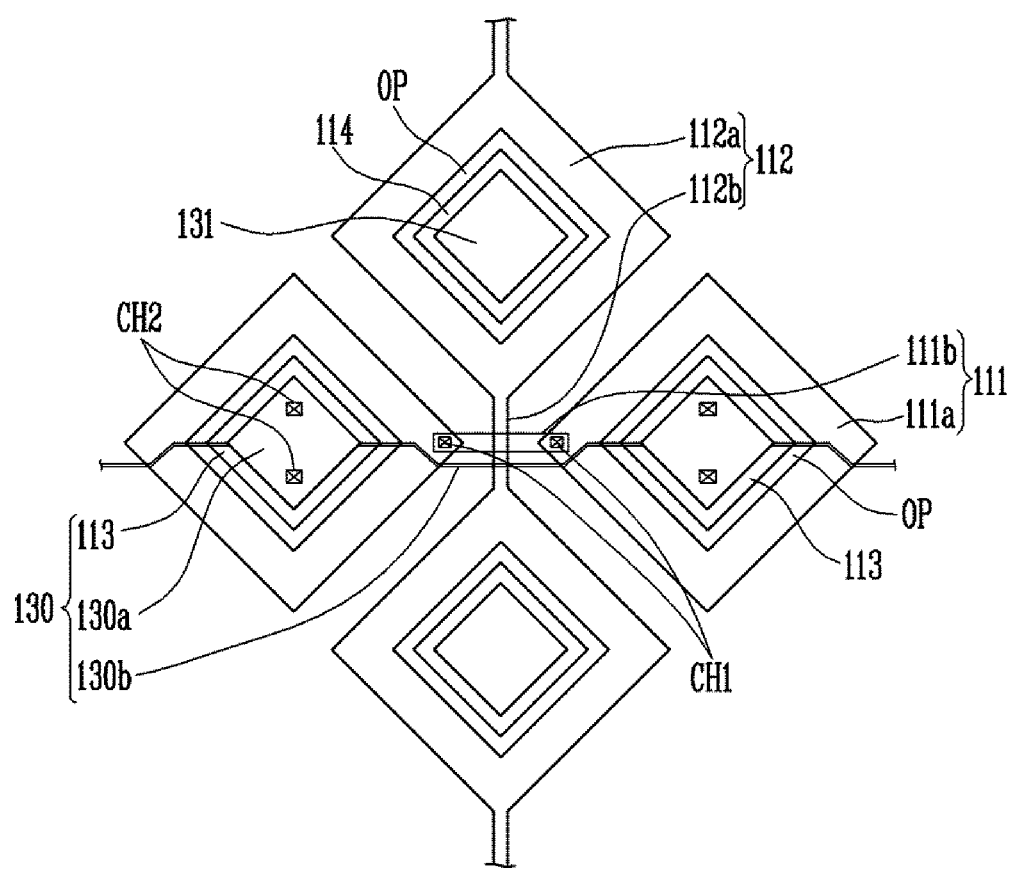

Referring to FIG. 10, among the first dummy patterns 113 and the electrode parts 130a, a first dummy pattern 113 and an electrode part 130a, which form a pair and overlap each other, may be electrically coupled to each other through at least one second contact hole CH2. For example, the first dummy pattern 113 and the electrode part 130a, which overlap each other, may be electrically coupled to each other through a plurality of second contact holes CH2 formed through the first insulating layer 102 interposed therebetween. Accordingly, each second electrode 130 may be implemented as a multi-layer structure. That is, in the exemplary embodiments, the first dummy patterns 113 may constitute respective second electrodes 130, together with the electrode parts 130a and the coupling lines 130b.

Figure 11:
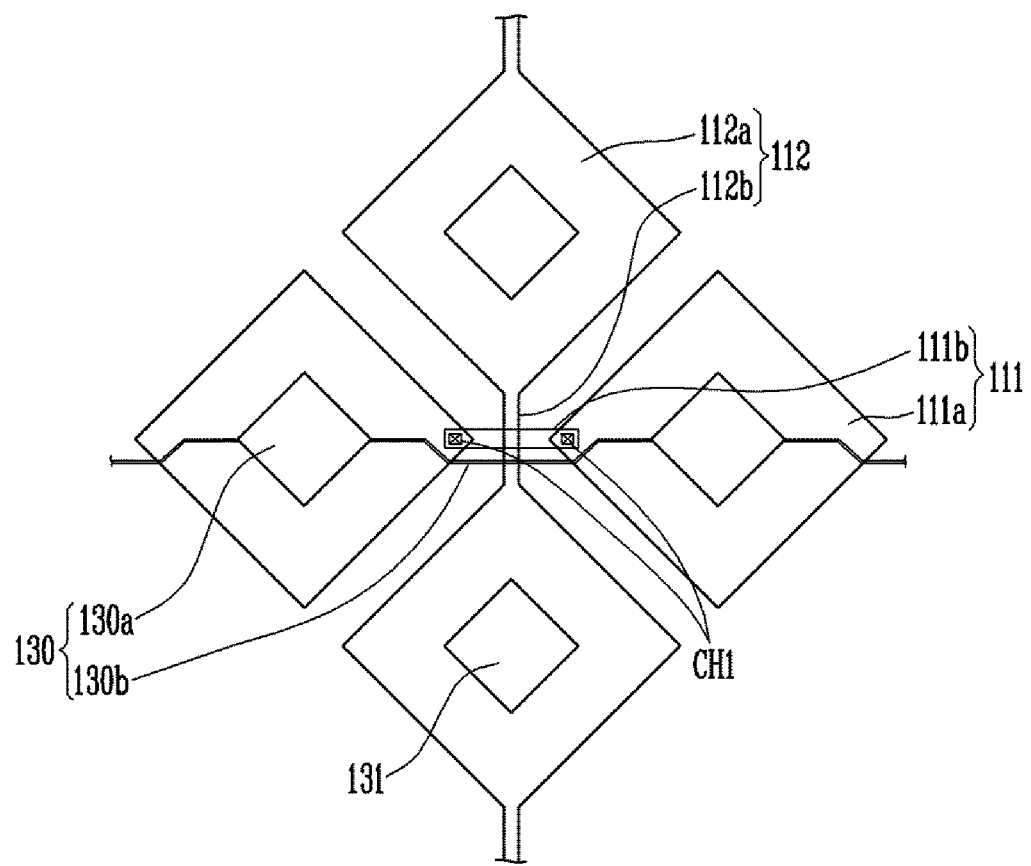

Referring to FIG. 11, each of first and second electrode cells 111a and 112a may not include an opening OP, and the first and second dummy patterns 113 and 114 may not be provided. Here, the electrode parts 130a may be arranged in the first electrode cells 111a to overlap respective certain regions of the first electrode cells 111a, in particular, central regions. Here, the electrode parts 130a may be arranged spaced apart from the first electrode cells 111a, with at least the first insulating layer 102 being interposed between the electrode parts 130a and the first electrode cells 111a, thus enabling the first direction-first electrodes 111 and the second electrodes 130 to be maintained in an isolated state.

Figure 12:
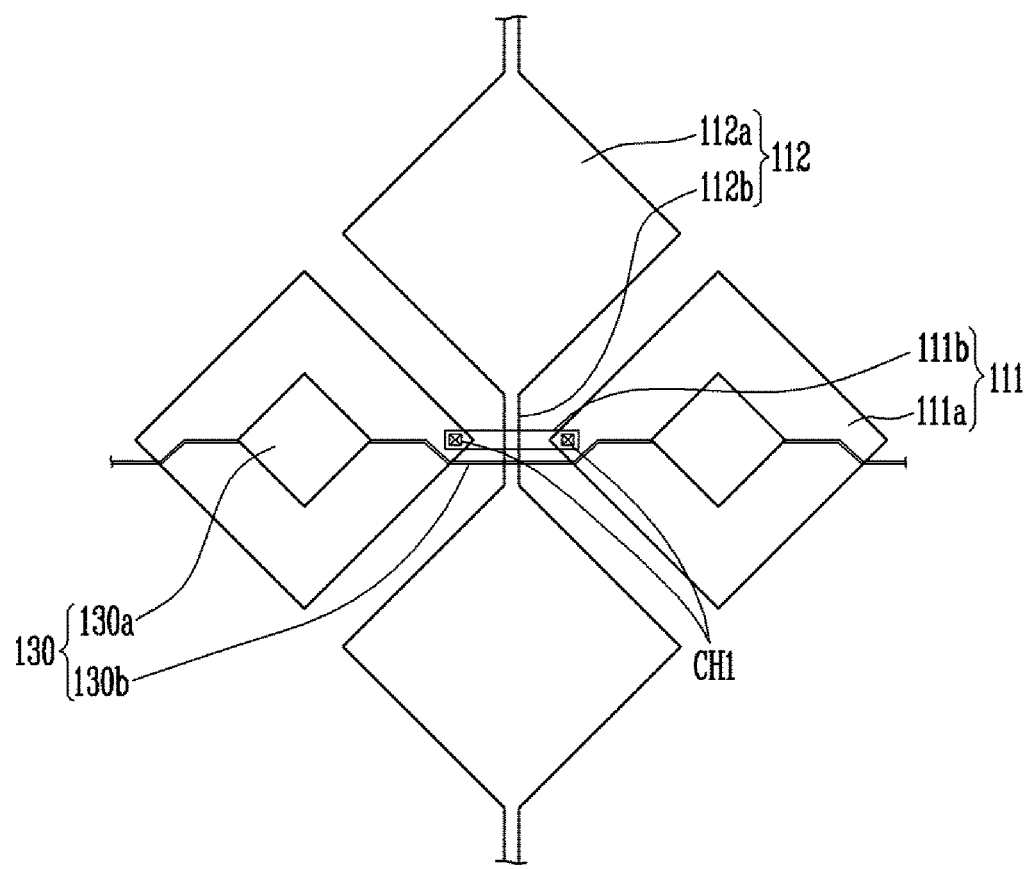

Referring to FIG. 12, the third dummy patterns 131 in the exemplary embodiment of FIG. 11 may not be provided. That is, in the exemplary embodiment of FIG. 12, all of first, second, and third dummy patterns 113, 114, and 131 may be omitted except for only minimum components required to constitute the second electrodes 130.

As in the above-described exemplary embodiments, the sensor unit 100 includes first and second electrodes 110 and 130 distributed over the active area AA in order to detect a touch input and a noise voltage Vnoise, respectively. In accordance with an exemplary embodiment, the structures and shapes of the first electrodes 110 and the second electrodes 130 may be changed in various forms.

Figure 13:
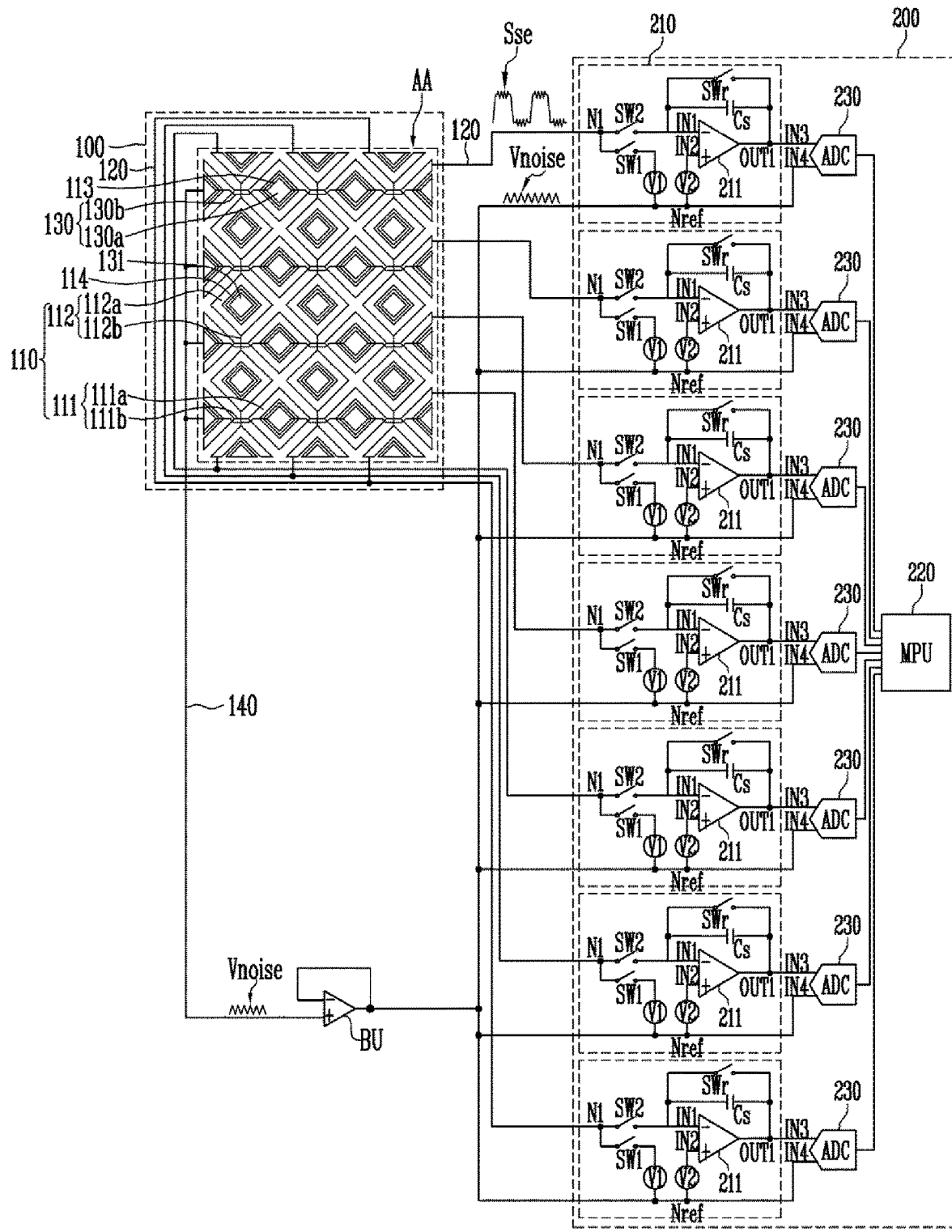
FIG. 13 is a diagram of a second embodiment of a touch sensor constructed according to the principles of the invention.

FIG. 13 is a diagram of a second embodiment of a touch sensor constructed according to the principles of the invention, and illustrates a modification of the touch sensor shown in FIG. 3. In FIG. 13, the same reference numerals are used to designate components similar or identical to those in FIG. 3, and a detailed description of the components will be omitted to avoid redundancy.

Referring to FIG. 13, each of sensing channels 210 may include a capacitor Cs and a reset switch SWr coupled in parallel between a first input terminal IN1 and an output terminal OUT1 of a first amplifier 211. That is, in an exemplary embodiment of FIG. 13, the locations of the capacitor Cs and the reset switch SWr are changed to the locations between the first input terminal IN1 and the output terminal OUT1 of the first amplifier 211. In an exemplary embodiment, the first input terminal IN1 may be an inverting input terminal, and the second input terminal IN2 may be a non-inverting input terminal, but exemplary embodiments are not limited thereto. On the other hand, a second voltage source V2 coupled between the second input terminal IN2 of the first amplifier 211 and a reference node Nref may be a predetermined bias power supply. In the above-described embodiment, the first amplifier 211 may function as an integrator.

In accordance with an exemplary embodiment, an analog-to-digital converter (ADC) 230 may be coupled between each first amplifier 211 and a processor 220. Here, ADCs 230 may be provided for respective sensing channels 210 in a one-to-one correspondence or, alternatively, a single ADC 230 may be shared by plurality of sensing channels 210. In an embodiment in which the plurality of sensing channels 210 share the single ADC 230, a switching circuit for selecting a channel may be additionally coupled between the sensing channels 210 and the ADC 230. For the convenience of description, it is assumed that the plurality of ADCs 230 correspond to the sensing channels 210, respectively.

Each of the ADCs 230 may include a third input terminal IN3 coupled to the output terminal of the corresponding sensing channel 210 (e.g., the output terminal OUT1 of the first amplifier 211) and a fourth input terminal IN4 coupled to the reference node Nref of the corresponding sensing channel 210.

In accordance with an exemplary embodiment, each of the ADCs 230 may be implemented as a differential ADC that is operated in a differential mode and outputs a digital signal corresponding to a difference between the voltages of the third and fourth input terminals IN3 and IN4. Such ADCs 230 may convert the output voltages generated by the sensing channels 210 into digital signals, and output the digital signals. For example, each of the ADCs 230 may output a digital signal corresponding to the difference between the output voltage of the corresponding first amplifier 211 and the voltage of the corresponding reference node Nref. Meanwhile, in an exemplary embodiment, each of the ADCs 230 may be implemented as a single input type (single ended) ADC. In this case, a differential amplifier or the like may be additionally coupled between the sensing channel 210 and the ADC 230 corresponding to each other. The digital signals output from the ADCs 230 may be input to the processor 220 and are used to detect a touch input.

The above-described exemplary embodiment is configured such that the comparators provided in the sensing channels 210 in the embodiment of FIG. 3 are replaced with integrators, and thus the internal structures and operations of the sensing channels 210 may be changed in various ways. Even in the exemplary embodiment of FIG. 13, the reference nodes Nref are coupled to the second electrodes 130, thus enabling noise components included in sensing signals Sse input to the sensing channels 210 to be effectively eliminated.

Figure 14:
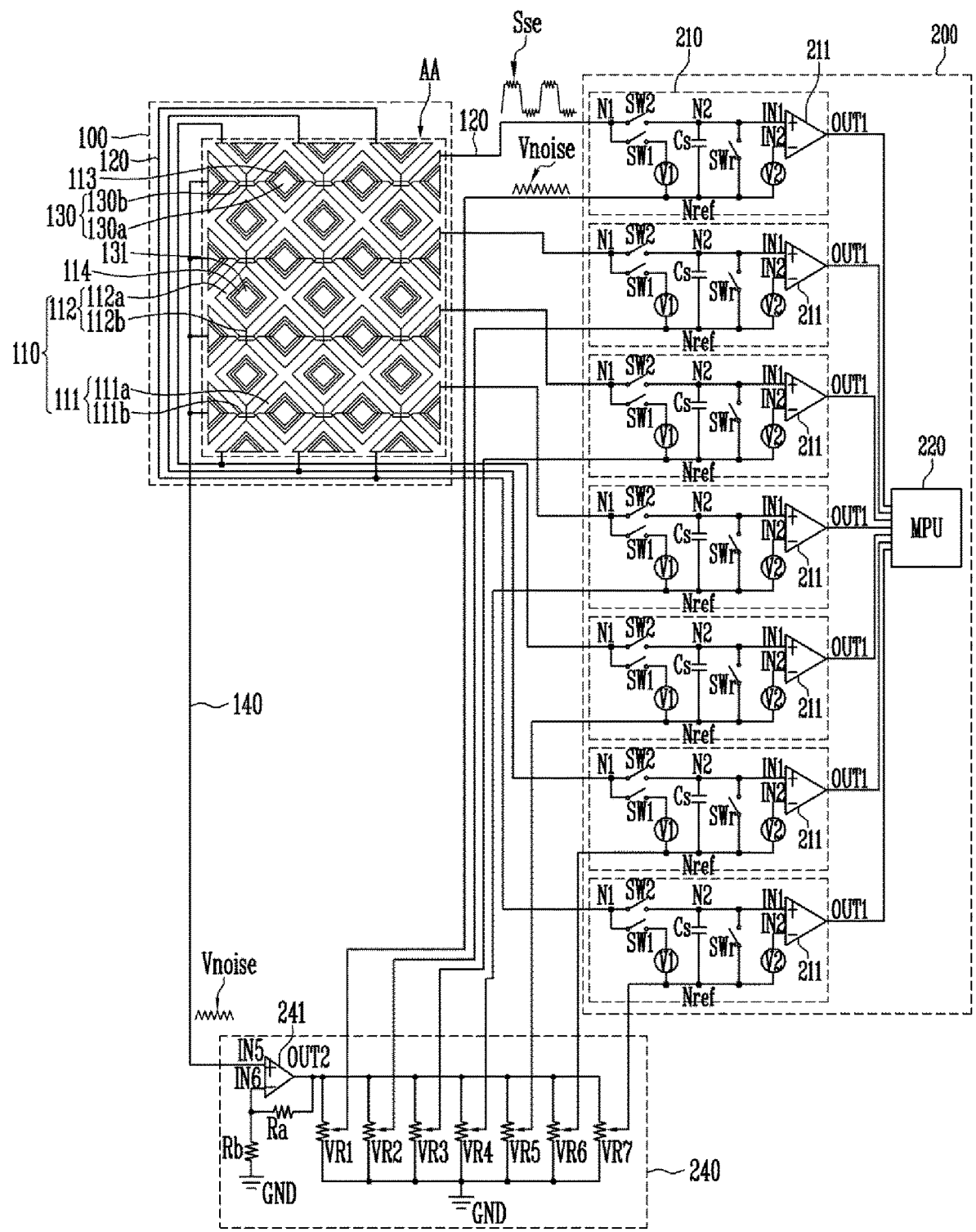
FIG. 14 is a diagram of a third embodiment of a touch sensor constructed according to the principles of the invention.

FIG. 14 is a diagram of a third embodiment of a touch sensor constructed according to the principles of the invention, and illustrates a modification of the touch sensor illustrated in FIG. 3. In FIG. 14, the same reference numerals are used to designate components similar or identical to those in FIG. 3, and a detailed description of the components will be omitted to avoid redundancy.

Referring to FIG. 14, the touch sensor according to an exemplary embodiment may further include an amplification circuit 240 coupled between second electrodes 130 and reference nodes Nref. In accordance with an exemplary embodiment, the amplification circuit 240 may include a second amplifier 241 configured to receive noise voltages Vnoise from the second electrodes 130 via a second line 140, and at least one variable resistor (at least one of VR1 to VR7) coupled between an output terminal OUT2 of the second amplifier 241 and a predetermined reference voltage source (hereinafter assumed to be "ground GND").

In accordance with an exemplary embodiment, the variable resistor (at least one of VR1 to VR7) may be coupled to the reference node Nref of at least one of the sensing channels 210. That is, each variable resistor (any one of VR1 to VR7) may be coupled between the output terminal OUT2 of the second amplifier 241 and the reference node Nref of at least one of the sensing channels 210.

For example, the amplification circuit 240 may include a plurality of variable resistors VR1 to VR7 corresponding to respective sensing channels 210, and the variable resistors VR1 to VR7 may be coupled to the reference nodes Nref of different sensing channels 210. That is, the reference nodes Nref of the respective sensing channels 210 may be coupled to the second electrodes 130 via at least one variable resistor (at least one of VR1 to VR7).

In accordance with an exemplary embodiment, the second amplifier 241 may include a fifth input terminal IN5 coupled to the second electrodes 130 via the second line 140 and a sixth input terminal IN6 coupled to a predetermined reference voltage source GND. Ra and Rb of FIG. 14 illustrate the input/output impedances of the second amplifier 241.

In accordance with an exemplary embodiment, the plurality of the variable resistors VR1 to VR7 corresponding to respective sensing channels 210 may be coupled between the output terminal OUT2 of the second amplifier 241 and the reference voltage source GND. Further, in accordance with an exemplary embodiment, the variable resistors VR1 to VR7 may be coupled in parallel to each other. In this case, a gain of a signal input to the reference node Nref of each sensing channel 210, that is, a noise voltage Vnoise, may be independently adjusted depending on the magnitude of a noise component included in the sensing signal Sse input to the corresponding sensing channel 210.

In accordance with the above-described exemplary embodiment, noise gains for respective sensing channels 210 may be easily adjusted by adjusting the resistance values of the variable resistors VR1 to VR7 depending on the locations (e.g., X coordinate and/or Y coordinate) of the first electrodes 110 coupled to respective sensing channels 210. For example, the resistance values of respective variable resistors VR1 to VR7 may be independently adjusted such that the noise component of the sensing signal Sse input to the first node N of each sensing channel 210 is maximally cancelled by the noise voltage Vnoise input to the reference node Nref of the sensing channel 210.

In accordance with an exemplary embodiment, the resistance values of the variable resistors VR1 to VR7 may be set in the stage of designing products (the touch sensor and/or the display device having the touch sensor according to exemplary embodiments) or in a module process before the products are released. Alternatively, in accordance with exemplary embodiments, even after products have been released, the products may be designed such that the resistance values of the variable resistors VR1 to VR7 may be changed depending on predetermined time points or predetermined periods, or may be changed via an environmental setting (configuration) or the like based on a user's selection.

In the above-described exemplary embodiment, noise gains may be optimized and adjusted for respective sensing channels 210 using the amplification circuit 240 and the variable resistors VR1 to VR7 provided therein. Accordingly, even if sensing signals Sse detected from respective first electrodes 110 include different noise components depending on the respective locations of the first electrodes 110, the noise components may be effectively cancelled and eliminated.

In accordance with a touch sensor and a method of driving the touch sensor constructed according to the principles of the invention, noise flowing into the sensor unit of the touch sensor may be effectively reduced or cancelled. Accordingly, the malfunctioning of the touch sensor may be minimized, and sensing sensitivity may be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch sensor, comprising:
a substrate;
first electrodes disposed on the substrate and spaced apart from each other;
sensing channels electrically connected to the first electrodes by first lines, each sensing channel having a reference node;
second electrodes spaced apart from the first electrodes and connected to a respective one of the reference nodes of the sensing channels; and
a processor to receive output signals from the sensing channels, and to detect a touch input based on the output signals;
wherein the sensing channels are configured to:
supply driving signals to respective first electrodes through a respective one of the first lines during a first period,
receive sensing signals from the respective first electrodes through the same respective one of the first lines during a second period, and
generate the output signals corresponding to the sensing signals received from the respective first electrodes based on potentials of respective reference nodes,
wherein each of the first electrodes comprises at least one electrode cell including an opening,
wherein the second electrode includes an electrode part overlapping the opening formed in an electrode cell of at least one of the first electrodes, and
wherein the second electrodes are connected to each other by sharing a single line and connected to the reference node through the single line.

2. The touch sensor according to claim 1, wherein substrate comprises a thin film encapsulation layer.

3. The touch sensor according to claim 1, wherein a number of the sensing channels corresponds to a number of the first electrodes.

4. The touch sensor according to claim 1, wherein the first electrodes and the second electrodes are mesh shaped electrodes including a plurality of conductive fine lines.

5. The touch sensor according to claim 1, wherein each of the first electrodes further comprises coupling parts for connecting the at least one electrode cell.

6. The touch sensor according to claim 5, wherein the coupling parts are formed integrally with the at least one electrode cell.

7. A touch sensor, comprising:
a substrate;
first electrodes disposed on the substrate and spaced apart from each other;
sensing channels electrically connected to the first electrodes by first lines, each sensing channel having a reference node;
second electrodes spaced apart from the first electrodes and connected to a respective one of the reference node of the sensing channels; and
a processor to receive output signals from the sensing channels, and to detect a touch input based on the output signals;
wherein the sensing channels are configured to:
supply driving signals to respective first electrodes through a respective one of the first lines during a first period,
receive sensing signals from the respective first electrodes through the same respective one of the first lines during a second period, and
generate the output signals corresponding to the sensing signals received from the respective first electrodes based on potentials of respective reference nodes,
wherein the first electrodes comprise 1-1th electrodes extending in a first direction and 1-2th electrodes intersecting the first direction,
wherein each of the 1-1th electrodes and the 1-2th electrodes includes at least one electrode cell including an opening, and
wherein the second electrode includes an electrode part overlapping the opening formed in an electrode cell of at least one of the 1-1th electrodes, and
wherein some of the second electrodes are connected to each other by sharing a single line and connected to a respective reference node through the single line.

8. The touch sensor according to claim 7, wherein the touch sensor further comprises an insulating layer disposed between the 1-1th electrodes and the second electrode, and
wherein the second electrodes and the 1-1th electrodes are insulated from each other.

9. The touch sensor according to claim 7, wherein each of the 1-1th electrodes and the 1-2th electrodes further comprises coupling parts for connecting the at least one electrode cell.

10. The touch sensor according to claim 9, wherein the touch sensor further comprises a dummy pattern disposed in the opening provided in the at least one electrode cell of the 1-2th electrodes, and
wherein the dummy pattern is in a floating state in a form of an island.

* * * * *